United States Patent
Yamada

(10) Patent No.: US 9,590,865 B2
(45) Date of Patent: Mar. 7, 2017

(54) CONTROL DEVICE AND COMMUNICATION DEVICE

(71) Applicant: SHARP KABUSHIKI KAISHA, Osaka-shi, Osaka (JP)

(72) Inventor: Yuhsuke Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 182 days.

(21) Appl. No.: 14/374,784

(22) PCT Filed: Jan. 28, 2013

(86) PCT No.: PCT/JP2013/051748
§ 371 (c)(1),
(2) Date: Jul. 25, 2014

(87) PCT Pub. No.: WO2013/111899
PCT Pub. Date: Aug. 1, 2013

(65) Prior Publication Data
US 2015/0039740 A1 Feb. 5, 2015

(30) Foreign Application Priority Data

Jan. 27, 2012 (JP) .................................. 2012-015883

(51) Int. Cl.
*G06F 15/177* (2006.01)
*H04L 12/24* (2006.01)
(Continued)

(52) U.S. Cl.
CPC .............. *H04L 41/32* (2013.01); *G08C 17/02* (2013.01); *H04L 12/2807* (2013.01);
(Continued)

(58) Field of Classification Search
CPC .. H04L 29/06319; H04L 29/08558–29/08576; H04W 76/00–76/068
See application file for complete search history.

(56) References Cited

U.S. PATENT DOCUMENTS 5,745,733 A * 4/1998 Robinson .............. G06F 1/1632
709/209
9,311,446 B1 * 4/2016 Sathyamurthy ......... G06F 17/60
(Continued)

FOREIGN PATENT DOCUMENTS

| JP | 2010-68346 A | 3/2010 |
| JP | 2011-49925 A | 3/2011 |
| JP | 2011-123836 A | 6/2011 |

OTHER PUBLICATIONS

Sharp, "PLC Adapter Operation Manual", 12R02303/US:9120878US01 dated Aug. 24, 2007.
ZigBee Specification, Document 053474r17, 2007.

*Primary Examiner* — Brendan Higa
(74) *Attorney, Agent, or Firm* — Birch, Stewart, Kolasch & Birch, LLP

(57) ABSTRACT

A control device is a control device that manages a network including a plurality of communication devices. The control device includes: a mode transition unit that makes transition to a leave mode for disconnecting a communication device from the network; an initialization-reset transmitting unit that transmits, when a notification is accepted from at least one communication device of the plurality of communication devices during the leave mode, an instruction for setting a flag and a reset order to the communication device from which the notification is accepted, the flag defining to bring the communication device back to an initial state; and a deleting unit that determines whether or not the instruction for setting the flag and the reset order are received and that deletes information about the communication device connected to the network when it is determined that the instruction for setting the flag and the reset order are received.

8 Claims, 22 Drawing Sheets

(51) Int. Cl.
*H04W 76/06* (2009.01)
*H04W 76/00* (2009.01)
*H04L 29/08* (2006.01)
*G08C 17/02* (2006.01)
*H04L 12/28* (2006.01)

(52) U.S. Cl.
CPC ....... *H04L 29/08576* (2013.01); *H04W 76/00* (2013.01); *H04W 76/06* (2013.01); *G08C 2201/20* (2013.01); *G08C 2201/42* (2013.01)

(56) References Cited

U.S. PATENT DOCUMENTS

| | | | |
|---|---|---|---|
| 2008/0082541 A1* | 4/2008 | Davidson | H04L 67/1095 |
| 2008/0192312 A1 | 8/2008 | Hendricks et al. | |
| 2011/0049987 A1 | 3/2011 | Kobayashi | |
| 2015/0065055 A1* | 3/2015 | Newham | H04W 4/008 |
| | | | 455/41.3 |
| 2015/0327319 A1* | 11/2015 | Yae | H04W 76/028 |
| | | | 455/41.2 |

* cited by examiner

FLOWCHART OF RELAY (ZigBee MANAGER)

FLOWCHART OF RELAY (ZigBee MANAGER)

FLOWCHART OF RELAY (ZigBee MANAGER)

FLOWCHART OF RELAY (ZigBee MANAGER)
(INVOKING SIDE DESIGNATES ADDRESS OF DEVICE TO LEAVE)

FIG.14 FLOWCHART OF TAP

FLOWCHART OF CGI PROGRAM

FLOWCHART OF RELAY (ZigBee MANAGER)
(INVOKING SIDE DESIGNATES ADDRESS OF DEVICE TO LEAVE)

FLOWCHART OF TAP

CONTROL DEVICE AND COMMUNICATION DEVICE

TECHNICAL FIELD

The present invention particularly relates to a communication device included in a network and a control device that controls the communication device.

BACKGROUND ART

Conventionally, a communication system has been known which includes: a plurality of power consumption measuring instruments (hereinafter, also referred to as "taps"); a control device for collecting power information from the plurality of taps and controlling them; and an electronic device including a display. Each of the taps is connected to a receptacle in a house and measures an instantaneous power consumption of a household appliance connected to the tap. Further, each of the taps accumulates the instantaneous power consumptions to store an integrated power consumption. The electronic device including the display obtains the power information (the instantaneous power consumption and the integral power consumption) of each of the taps via the control device and is used to illustrate the power information of each tap in the form of a graph.

In such a communication system, a certain communication method is used to communicate between each tap and the control device. According to a general communication method, when starting to use each of the taps and the control device, a pairing process (or also referred to as "join process") is necessary in order to allow each of the taps and the control device to be on the same network.

The pairing process is to allow a tap to participate in the network of the control device. The network of the control device means a network formed by the control device or a network in which the control unit is currently participating. Participating in a network is also referred to as "joining".

Upon performing the pairing process, the tap to join stores information (hereinafter, referred to as "network information") about the network of the control device. In addition, the control device stores information (hereinafter, referred to as "device information") about the tap. Here, the storing is also referred to as "registering".

Generally, these information are stored in nonvolatile memories of both the tap and the control device. Hence, once the pairing process is over, the information will not be lost even when the power source is turned off. Therefore, the pairing process is performed only once upon starting the use thereof.

Moreover, generally, the pairing process is usually performed in accordance with a user. Some types of products are through such a pairing process between a control device and a plurality of taps in factory before shipment. However, in order to add a tap at a later point of time or the like, it can be said that the pairing process performed in accordance with the user is substantially essential. In doing so, the method for pairing process should be as simple as possible such that anyone can perform the pairing process.

In some communication methods, the control device is configured not to store the information (device information) about the tap. However, in the present invention, it is assumed that the control device stores the information (device information) about the tap.

Meanwhile, a leave process is an operation contrary to the pairing process. The leave process is to withdraw the tap from the network of the control device. The withdrawal from the network is also referred to as "leaving". When the leave process is performed, the tap to leave deletes the network information stored in the tap. Moreover, the control device deletes the information (device information) about the tap stored in the control device.

To summarize, when starting the use of the tap, the tap needs to join the network formed by the control device. Moreover, when ending the use of the tap, the tap needs to leave from the network formed by the control device.

The leave process is necessary because the following inconveniences would otherwise arise.

Inconvenience (1): If an unused tap is not left and is kept on the network, the control device assumes that the tap exists thereon, and attempts to continue communication with the tap. When the tap is disconnected from the receptacle, the communication cannot be made. However, the control device cannot precisely determine whether or not the tap is disconnected from the receptacle. Accordingly, some communication with the tap will continue. This results in occurrence of unnecessary and wasteful traffic on the network.

Inconvenience (2): If an unused tap is not left and is kept on the network, the tap may continue to transmit some packets to the network when the tap is connected to the receptacle. This also results in occurrence of unnecessary and wasteful traffic on the network.

Inconvenience (3): In the case where an upper limit is set as to the number of devices registerable in the control device, the upper limit is practically reduced by one in number. Because there is a limit in the number of registerable devices, the device information of an unused tap should be deleted from the control device.

Inconvenience (4): If an unused tap is lost and a third party obtains the tap, the third party may be able to monitor communication using the tap. Because the tap has the network information stored therein, the tap is capable of communicating with other devices on the network. This is not good in terms of security.

Further, for the leave process, the registered information should be deleted from both the tap to leave and the control unit in conjunction with the tap and the control device. If they are not in conjunction with each other, the registered information may be deleted from one of them but may not be deleted from the other. Specifically, the following two cases may take place.

Case (1): The network information is deleted from the tap to leave. However, the device information about the tap is not deleted from the control device. In this case, the above-described inconvenience (1) and inconvenience (3) may take place.

Case (2): The device information about the tap is deleted from the control device. However, the network information is not deleted from the tap to leave. In this case, the above-described inconvenience (2) and inconvenience (4) may take place.

Non-Patent Document 1 discloses a leave process in the ZigBee® specification. This specification indicates a method of participating in a ZigBee network and a method of withdrawing therefrom.

Here, the leave process in the ZigBee specification will be described.

Here, for the purpose of explanation, the device forming the network will be referred to as a "parent node". A device participating in the network of the parent node will be referred to as a "child node". The leave process is performed in two manners depending on whether the leave process is started by the parent node or the child node. A node to start the leave process is also referred to as an "initiator".

(1) Case where Child Node Starts Leave Process:

When the initiator is the child node, the child node provides a notification, through broadcasting, that the child node is leaving (withdrawing) from the network.

Specifically, the child node provides a NLME-LEAVE.request(DeviceAddress=NULL), which is a leave command, through broadcasting for the purpose of notification.

When the other nodes receive this, the other nodes delete the information about the node to leave, from its adjacent table or other internal data structures (Non-Patent Document 1: 3.6.1.10.3 Upon Receipt of the Leave Command Frame).

However, the child node having withdrawn does not delete the network information. The child node having withdrawn is only temporarily brought into a hold state (state in which it does not participate in the network after being reset).

Therefore, for example, when the child node is powered on again, the child node can participate in the network held in the child node again.

(2) Case where Parent Node Starts Leave Process (with Child Node being Designated):

When the initiator is the parent node, the parent node designates a child node to leave and requests it to leave.

Specifically, through unicasting, the parent node notifies the child node to leave by means of a NLME-LEAVE.request(DeviceAddress=NonNULL), which is a leave command.

When the child node receives this, the child node is temporarily brought into the hold state (state in which it does not participate in the network after being reset) but does not delete the network information. According to a certain implementation, the child node is brought into the hold state 5 seconds after receiving it. On the other hand, the parent node deletes the information about the child node to leave, from its adjacent table or other internal data structures (Non-Patent Document 1: 3.6.1.10.2 Method for a Device to Remove Its Child from the Network).

Thus, even through the child node is withdrawn from the network, the network information or the like is maintained in the child node. Therefore, for example, when the child node is powered on again, the child node can participate in the network held in the child node.

In the meanwhile, according to another conventional technique, by pressing a button of a tap for a long time, network information is deleted from the tap or the tap is initialized (to the factory settings).

Regarding this point, Non-Patent Document 2 shows a method of canceling registration of a PLC adapter, for example.

Specifically, Non-Patent Document 2 shows an operation of pressing a setting button of the PLC adapter for a long time, specifically, 10 seconds or longer. With this operation, the information set in the PLC adapter can be initialized (to the factory settings).

CITATION LIST

Non Patent Document

NPD 1: ZigBee Alliance "ZIGBEE SPECIFICATION ZigBee Document053474r17", ZigBee Standards Organization, Jan. 17, 2008
NPD 2: PLC adapter operation manual, type HN-VA 10S HN-VA40S, p 23

SUMMARY OF INVENTION

Technical Problem

However, according to the ZigBee specification, which is a conventional technique (Non-Patent Document 1), the parent node deletes the information (device information) about the child node but the child node does not delete the network information of the parent node. Assuming that the parent node serves as a control device and the child node serves as a tap, the above-described inconvenience (2) and inconvenience (4) may take place.

Meanwhile, if the method of the conventional technique (Non-Patent Document 2) such as the PLC adapter is employed, only the PLC adapter deletes the information registered therein. This has no influence over other devices on the PLC network. Thus, assuming that the PLC adapter serves as the child node, the child node deletes the network information but the parent node does not delete the information (device information) about the child node. Assuming that the parent node serves as the control device and the child node serves as the tap, the above-described inconvenience (1) and inconvenience (3) may take place.

The present invention has been made to solve the foregoing problems and has an object to provide a control device and a communication device, by each of which each tap can be withdrawn from a network by a simple method without inconsistency between the control device and the tap.

Solution to Problem

A control device according to an aspect of the present invention is a control device that manages a network including a plurality of communication devices. The control device includes: a mode transition unit that makes transition to a leave mode for disconnecting a communication device from the network; an initialization-reset transmitting unit that transmits, when a notification is accepted from at least one communication device of the plurality of communication devices during the leave mode, an instruction for setting a flag and a reset order to the communication device from which the notification is accepted, the flag defining to bring the communication device back to an initial state; and a deleting unit that determines whether or not the instruction for setting the flag and the reset order are received and that deletes information about the communication device connected to the network when it is determined that the instruction for setting the flag and the reset order are received.

Preferably, the mode transition unit makes transition to the leave mode in accordance with a switch-operated instruction for making transition to the leave mode.

Preferably, the mode transition unit makes transition to the leave mode in accordance with an execution instruction for making transition to the leave mode.

A control device according to another aspect of the present invention is a control device that manages a network including a plurality of communication devices. The control device includes: a deletion instruction accepting unit that accepts an instruction for disconnecting at least one communication device of the plurality of communication devices from the network; an initialization-reset transmitting unit that transmits an instruction for setting a flag and a reset order to the communication device accepted by the deletion instruction accepting unit, the flag defining to bring the communication device back to an initial state; and a deleting unit that determines whether or not the instruction for setting the flag and the reset order are received and that deletes information about the communication device connected to the network when it is determined that the instruction for setting the flag and the reset order are received.

A control device according to still another aspect of the present invention is a control device that manages a network including a plurality of communication devices. The control device includes: a deletion instruction accepting unit that accepts an instruction for disconnecting at least one communication device of the plurality of communication devices from the network; an initialization-reset transmitting unit that transmits an instruction for setting a flag and a reset order to the communication device accepted by the deletion instruction accepting unit, the flag defining to bring the communication device back to an initial state; and a deleting unit that deletes information about the communication device connected to the network.

A communication device according to an aspect of the present invention is a communication device including: a withdrawal declaration transmitting unit that transmits, in response to an instruction, a withdrawal declaration signal to a control device that manages a network including a plurality of communication devices, the withdrawal declaration signal declaring that the communication device has been withdrawn from the network; and an initializing unit that sets a flag defining to bring the communication device back to an initial state, so as to disconnect the communication device from the network, and that performs an initializing process in accordance with the flag.

Preferably, the instruction is an instruction of an operation unit.

Preferably, the instruction is an instruction from the control device.

Advantageous Effects of Invention

According to the present invention, each communication device can be withdrawn from a network by a simple method without inconsistency between the control device and the communication device.

DESCRIPTION OF EMBODIMENTS

Figure 1:
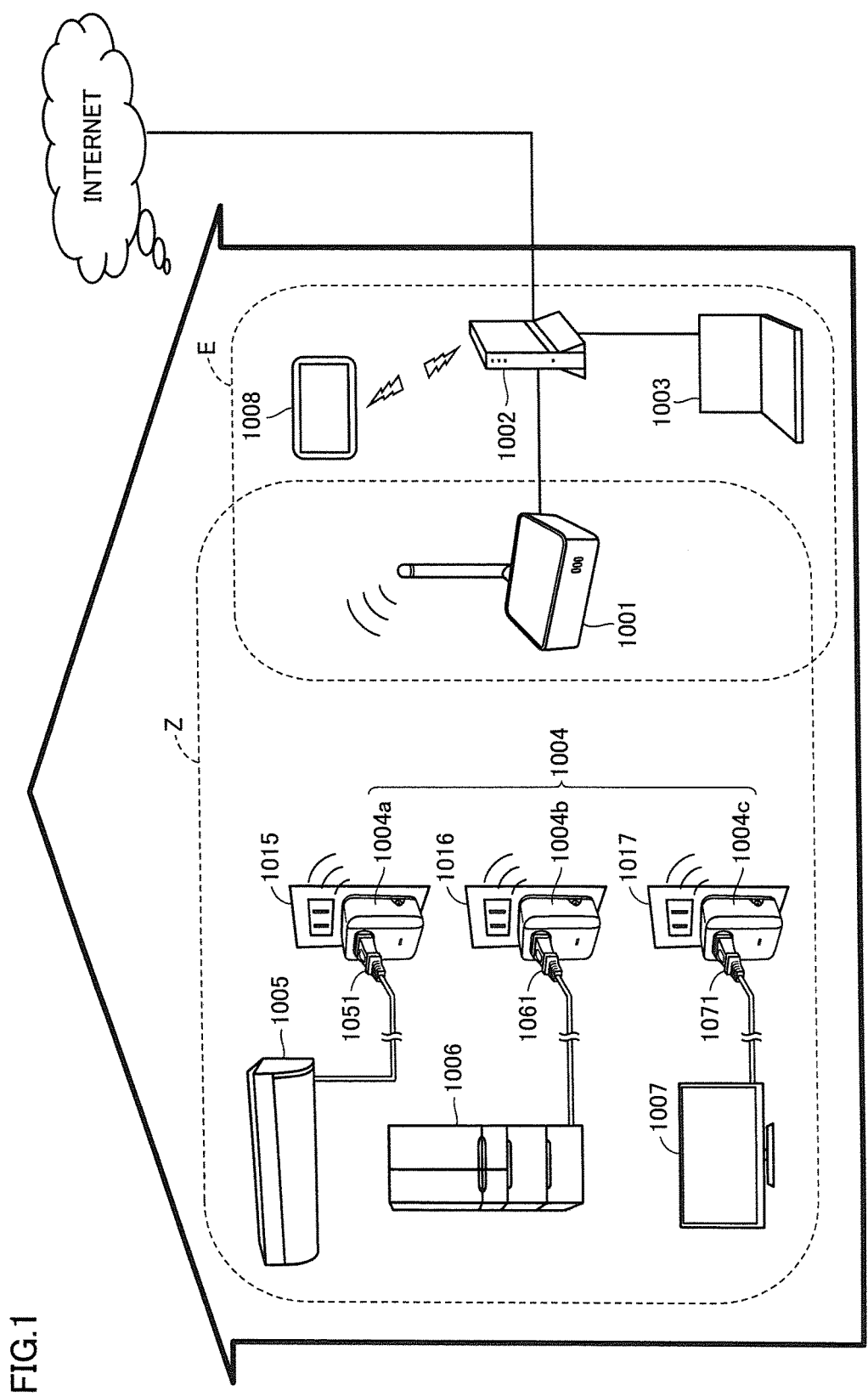
FIG. 1 shows a schematic configuration of a network according to an embodiment of the present invention.

The following describes an embodiment of the present invention with reference to figures. In the following description, the same reference characters are given to the same components. Their names and functions are also the same. Therefore, they are not repeatedly described in detail.

<A. Overview of Network>

FIG. 1 shows a schematic configuration of a network according to the embodiment of the present invention.

Referring to FIG. 1, a system according to the embodiment of the present invention includes a network Z and a network E. Network Z represents a low-speed wireless communication network (assuming ZigBee in the present example). Network E represents a high-speed communication network (assuming Ethernet®, WiFi®, or a combination thereof in the present example). In the present example, the networks employing the above-described methods will be described but the present invention is not particularly limited to the above-described methods. For example, network Z can employ Z-WAVE®, Bluetooth®, specified low power radio, or the like. On the other hand, network E can employ PLC (Power Line Communications) or the like, for example.

Network Z includes a relay 1001, a plurality of taps 1004a, 1004b, 1004c, and the like.

Network E includes relay 1001, a broadband router 1002, a personal computer 1003, and the like. Only relay 1001 is included in both network Z and network E. Moreover, relay 1001 has a HTTP (Hyper Text Transfer Protocol) server function.

A plurality of household appliances (such as an air conditioner 1005, a refrigerator 1006, and a television 1007) are respectively connected to the plurality of taps 1004a, 1004b, 1004c.

Air conditioner 1005 has a power plug 1051 inserted in a socket of tap 1004a. Similarly, refrigerator 1006 has a power plug 1061 inserted in a socket of tap 1004b. Moreover, television 1007 has a power plug 1071 inserted in a socket of tap 1004c.

Taps 1004a, 1004b, 1004c are respectively attached to receptacles 1015, 1016. 1017 provided in the house. Accordingly, electric power is supplied to taps 1004a, 1004b, 1004c.

Taps 1004a, 1004b, 1004c are power consumption measuring instruments that measure power consumptions of the household appliances connected thereto, respectively. For example, tap 1004a measures a power consumption of air conditioner 1005. Each of taps 1004a. 1004b, 1004c can transmit the measured power consumption to relay 1001. It should be noted that in the description below, for ease of explanation, a term "tap 1004" is also employed when taps 1004a, 1004b, 1004c are not distinguished from one another.

Each of relay 1001 and the plurality of taps 1004 includes a low-speed wireless communication module. Relay 1001 and the plurality of taps 1004 constitute low-speed wireless communication network Z (hereinafter, also simply referred to as "network Z"). Moreover, relay 1001 is connected to broadband router 1002 via Ethernet. Relay 1001 serves as a bridge (medium conversion device) or a gateway (protocol conversion device) between network Z and network E. Relay 1001 performs low-speed wireless communication with the plurality of taps 1004. In other words, each of taps 1004 operates as a communication device. Relay 1001 operates as a control device that manages communication devices, such as the plurality of taps 1004, on the network.

Broadband router 1002 may be connected to the Internet. Personal computer 1003 is connected to broadband router 1002 via Ethernet or WiFi.

Personal computer 1003 is a general personal computer on which a browser (HTTP client) is operated. Personal computer 1003 communicates with the HTTP server of relay 1001 via the browser (HTTP client) of personal computer 1003. The HTTP server of relay 1001 is configured to invoke a setting CGI program to obtain the information of the relay and is configured to be settable. Thus, personal computer 1003 can perform various settings of relay 1001. With the operations of the HTTP server and the browser (HTTP client), complicated settings can be made even when relay 1001 has a poor input device.

The following exemplarily describes that ZigBee, which is one of short distance wireless communication standards for household appliances, is used for network Z.

<B. Configuration of Relay 1001>

Figure 2:
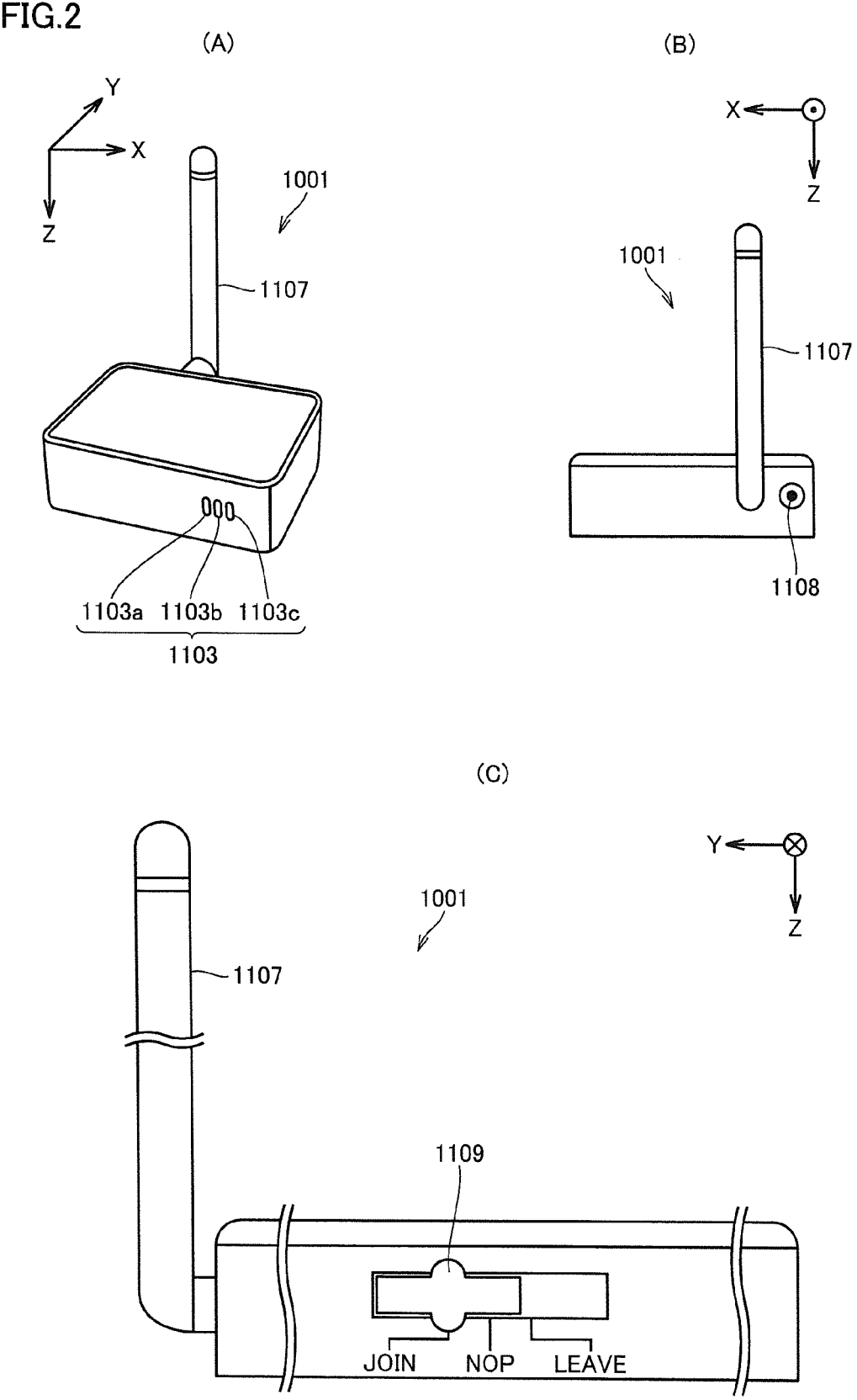
FIG. 2 shows an external appearance of a relay 1001.

FIG. 2 shows an external appearance of relay 1001.

FIG. 2(A) is a perspective view of relay 1001. FIG. 2(B) is a side view of relay 1001. FIG. 2(C) is an enlarged view of a major portion on the other side of relay 1001.

Referring to FIG. 2(A), relay 1001 includes a light emitting unit 1103 and an antenna 1107. Light emitting unit 1103 includes three LEDs (Light Emitting Diodes) 1103a, 1103b, 1103c for indicating operating states or the like of relay 1001.

LED 1103a is a light emitting device (power source LED) for indicating ON/OFF of the power source of relay 1001. LED 1103b is a light emitting device (tap LED) for indicating a state of communication with tap 1004. LED 1103c is a light emitting device (router LED) for indicating a state of communication with broadband router 1002.

Antenna 1107 is used to communicate with each of taps 1004a, 1004b, 1004c.

Referring to FIG. 2(B), relay 1001 further includes a push button 1108 at its surface opposite to the surface provided with light emitting unit 1103. Push button 1108 is a button for transitioning relay 1001 into a join permitted state (join mode) or a leave mode.

Referring to FIG. 2(C), relay 1001 further includes a slide switch 1109 at its surface different from the surface provided with light emitting unit 1103 and the surface provided with push button 1108. Slide switch 1109 is slid by a user's operation. Slide switch 1109 can be positioned at one of a JOIN position, a NOP position, and a LEAVE position. Slide switch 1109 is used when performing a join process with respect to the tap (process of allowing the tap to participate in the network) or performing a leave process (process of disconnecting (withdrawing) the tap from the network). Slide switch 1109 is set at the NOP position during normal use.

Figure 3:
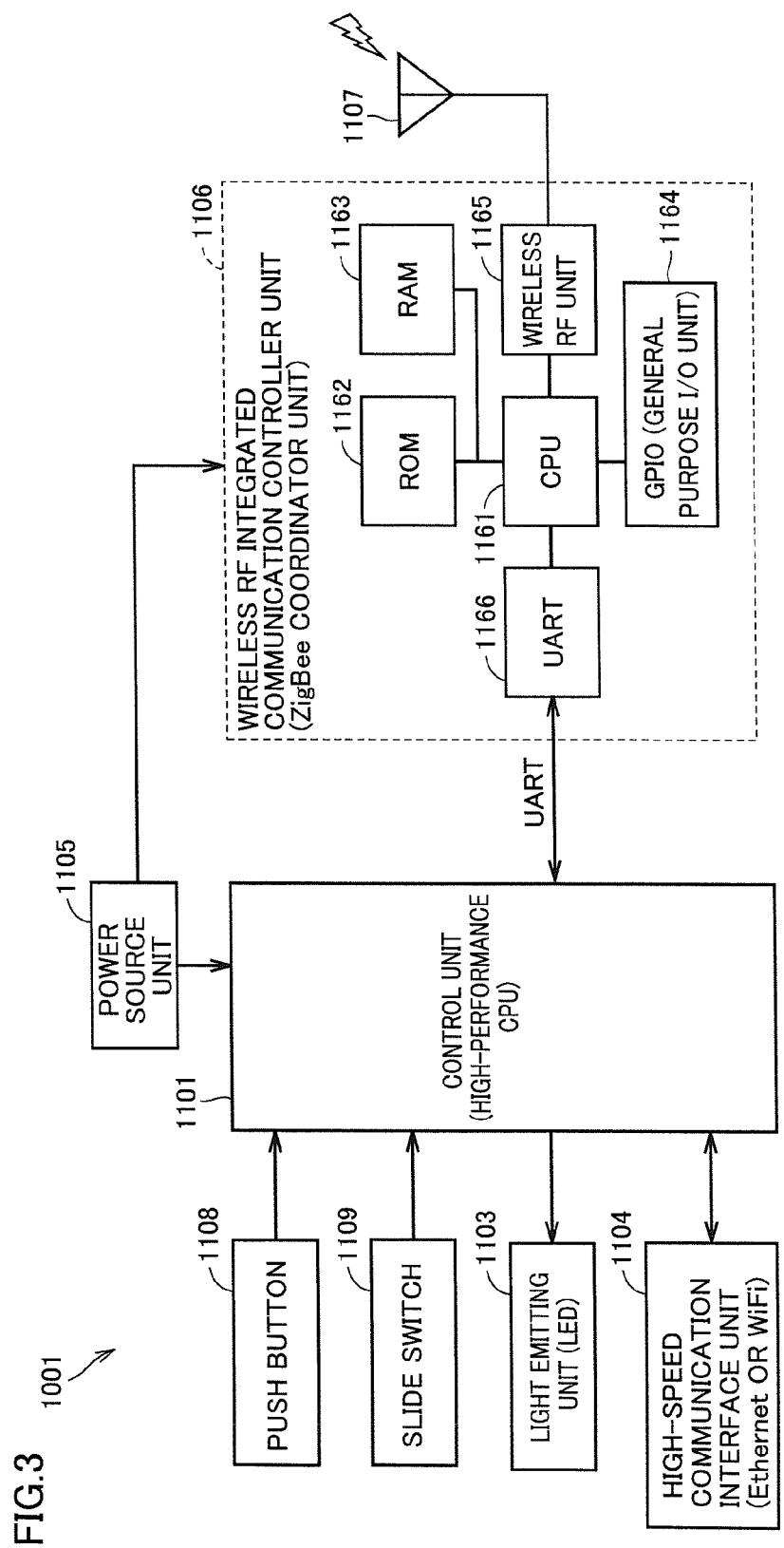
FIG. 3 is a block diagram of relay 1001.

FIG. 3 is a block diagram of relay 1001.

Referring to FIG. 3, relay 1001 includes a control unit 1101, light emitting unit 1103, a high-speed communication interface unit 1104, a power source unit 1105, a wireless RF (Radio Frequency) integrated communication controller unit 1106, antenna 1107, push button 1108, slide switch 1109, and a reset switch not shown in the figure.

Wireless RF integrated communication controller unit 1106 includes a CPU (Central Processing Unit) 1161, a ROM (Read Only Memory) 1162, a RAM (Random Access Memory) 163, a GPIO (General Purpose Input/Output) 1164, a wireless RF unit 1165, and a UART (Universal Asynchronous Receiver Transmitter) 1166 for making communication with control unit 1101. It should be noted that wireless RF integrated communication controller unit 1106 corresponds to a ZigBee coordinator unit. Further, ROM 1162, RAM 1163, UART 1166, GPIO 1164, and wireless RF unit 1165 are connected to CPU 1161. Generally, ROM 1162 is constructed of an NVRAM.

Wireless RF integrated communication controller unit 1106 is connected to antenna 1107. Wireless RF integrated communication controller unit 1106 controls communication with the communication devices on network Z.

For the OS (Operating System) of control unit 1101, Linux® can be used, for example. Control unit 1101 includes a CPU having performance higher than that of CPU 1161, and has a plenty of memories. With this configuration, relay 1001 is capable of implementing an advanced information process.

High-speed communication interface unit 1104 is an interface for making communication with broadband router 1002 through Ethernet or WiFi. Power source unit 1105 supplies electric power to control unit 1101 and wireless RF integrated communication controller unit 1106.

Control unit 1101 is connected to light emitting unit 1103, high-speed communication interface unit 1104, power source unit 1105, wireless RF integrated communication controller unit 1106, push button 1108, and slide switch 1109. Control unit 1101 controls the general operation of relay 1001. Control unit 1101 receives inputs from push button 1108 and slide switch 1109. Moreover, control unit 1101 provides an output instruction to light emitting unit 1103.

The following describes the gist of the user's operation when relay 1001 performs the join process with respect to tap 1004. First, the user slides slide switch 1109 of relay 1001 from the NOP position to the JOIN position. Then, the user pushes push button 1108. In this way, relay 1001 is in the join permitted state (join mode) for a predetermined period of time (such as 60 seconds). During this period, control unit 1101 causes light emitting unit 1103 to emit light in a predetermined manner. When the user inserts tap 1004 into a receptacle with relay 1001 being in the join permitted state, the join process is performed to allow tap 1004 to participate in the network.

The following describes the gist of the user's operation when relay 1001 performs the leave process with respect to tap 1004. First, the user slides slide switch 1109 of relay 1001 from the NOP position to the LEAVE position. Then, the user pushes push button 1108. In this way, relay 1001 is in the leave mode for a predetermined period of time (such as 60 seconds). During this period, control unit 1101 causes light emitting unit 1103 to emit light in a predetermined manner. Further, when setting button 2106 of tap 1004 having joined is pressed down while relay 1001 is in the leave mode, the leave process is performed to withdraw tap 1004 from the network.

<C. Configuration of Tap 1004>

Figure 4:
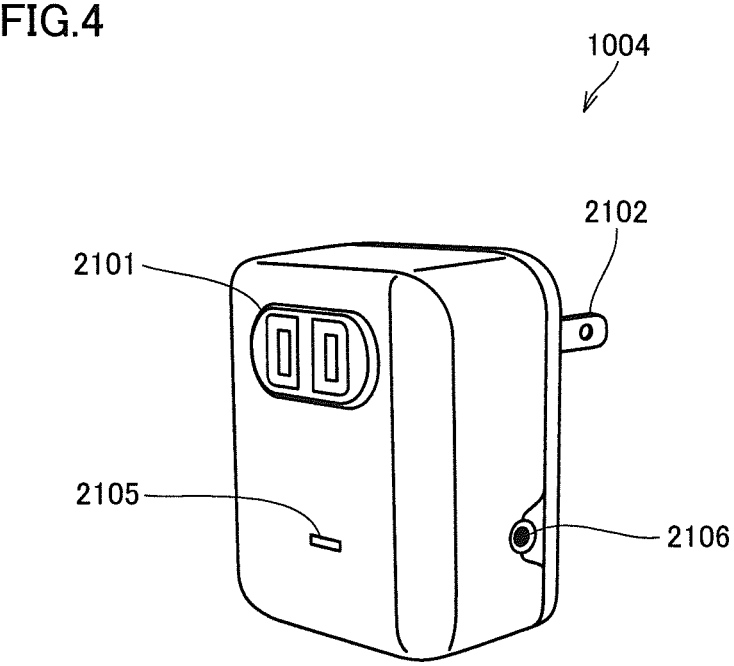
FIG. 4 is a perspective view of a tap 1004.

FIG. 4 is a perspective view of tap 1004.

Referring to FIG. 4, tap 1004 includes a socket 2101 for insertion of a plug, a plug 2102, an LED 2105, and a setting button 2106. While the tap is used, the user inserts the power plug of a household appliance into socket 2101 and inserts plug 2102 into a receptacle provided in the house (see FIG. 1). It should be noted that the shape of socket 2101 is determined depending on the shape of the power plug of the household appliance connected thereto.

Figure 5:
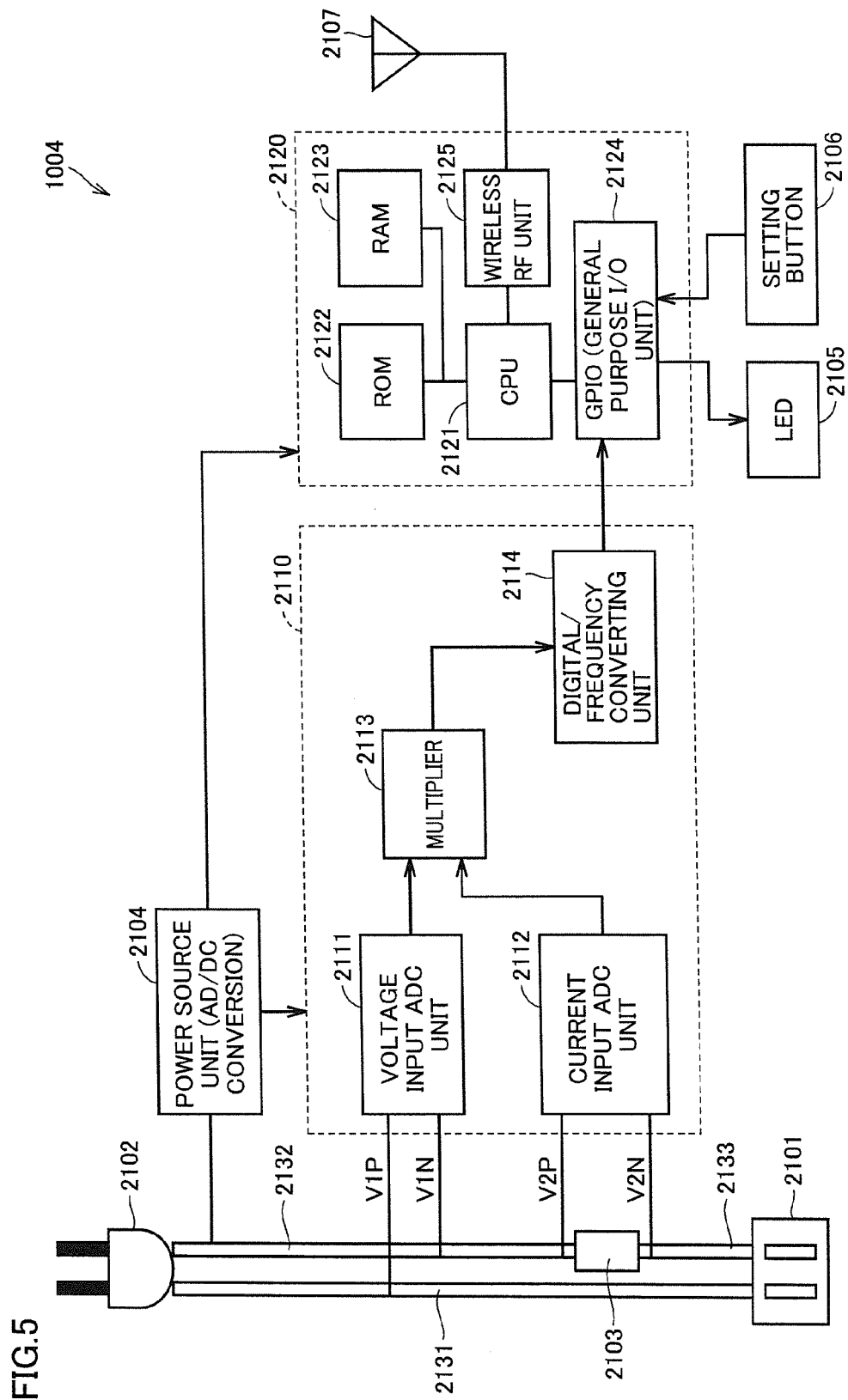
FIG. 5 shows a hardware configuration of tap 1004.

FIG. 5 shows a hardware configuration of tap 1004.

Referring to FIG. 5, tap 1004 includes socket 2101, plug 2102, a shunt resistor 2103, a power source unit 2104, LED 2105, setting button 2106, an antenna 2107, a power sensor unit 2110, a low-speed wireless communication module 2120, an interconnection 2131, an interconnection 2132, and an interconnection 2133.

Power sensor unit 2110 includes a voltage input ADC unit 2111, a current input ADC unit 2112, a multiplier 2113, and a digital/frequency converting unit 2114. Low-speed wireless communication module 2120 includes a CPU 2121, a ROM 2122, a RAM 2123, a GPIO 2124, and a wireless RF unit 2125.

Interconnection 2132 and interconnection 2133 are connected to each other by shunt resistor 2103. Shunt resistor 2103 has a small resistance (several hundreds µΩ) used to measure a current.

Socket 2101 and plug 2102 are connected to each other by interconnections 2131 to 2133 and shunt resistor 2103. Interconnection 2131 is connected to one terminal of plug 2102 and one terminal of socket 2101. Interconnection 2132 is connected to the other terminal of plug 2102 and one end of shunt resistor 2103. Interconnection 2133 is connected to the other terminal of socket 2101 and the other end of shunt resistor 2103.

Power source unit 2104 is connected to interconnection 2132. Power source unit 2104 converts an alternating current into a direct current. Power source unit 2104 provides power sensor unit 2110 and low-speed wireless communication module 2120 with the direct current power obtained through the conversion.

Voltage input ADC unit 2111 is connected to interconnection 2131 and interconnection 2132. Voltage input ADC unit 2111 outputs a voltage (potential difference) between interconnection 2131 and interconnection 2132 to multiplier 2113 as a digital signal.

Current input ADC unit 2112 is connected to interconnection 2132 and interconnection 2133. Current input ADC unit 2112 outputs the current value of a current flowing in shunt resistor 2103, to multiplier 2113 as a digital signal.

Multiplier 2113 multiplies the output of voltage input ADC unit 2111 with the output of current input ADC unit 2112, and outputs the resulting digital signal to digital/frequency converting unit 2114.

Digital/frequency converting unit 2114 converts the input digital signal into a frequency signal. Digital/frequency converting unit 2114 outputs the resulting frequency signal to the GPIO of low-speed wireless communication module 2120.

CPU 2121 performs data conversion onto the above-described frequency signal obtained from the GPIO. Wireless RF unit 2125 transmits the resulting signal to relay 1001 using antenna 2107.

ROM 2122 stores a program and the like to be executed by CPU 2121. RAM 2123 temporarily stores data to be processed by CPU 2121 and data processed by CPU 2121. Further, ROM 2122 is constructed of an NVRAM (Non Volatile RAM), and stores the program as well as various types of information (network information, configuration information, and the like).

LED 2105 indicates a data processing state of tap 1004 by means of blinking and/or color of light. Setting button 2106 is used to perform a setting process of tap 1004 or the like by the user. Specifically, setting button 2106 is used to perform the join process or the leave process and is used to initialize tap 1004.

<D. Exemplary Implementation>

Figure 6:
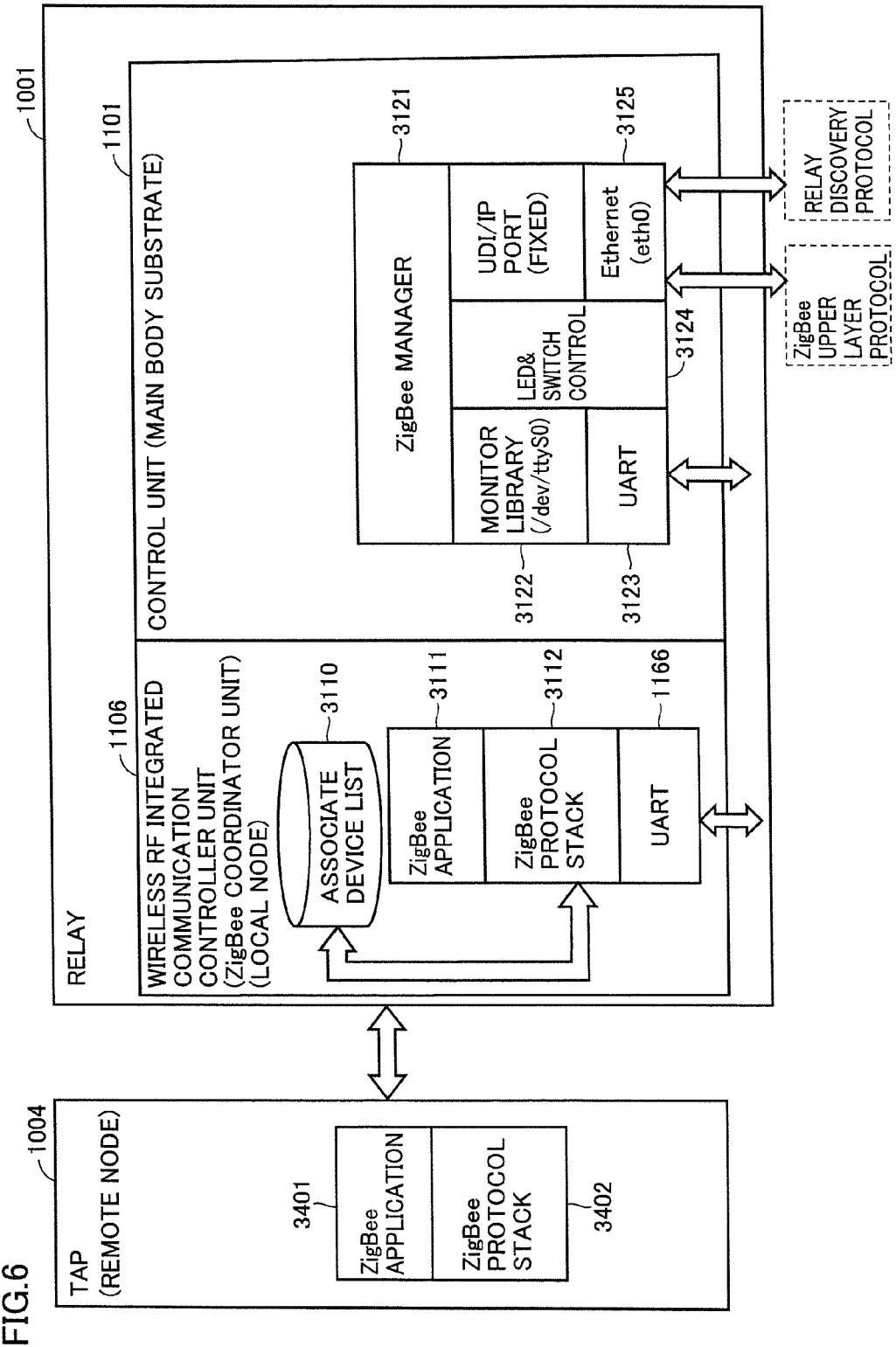
FIG. 6 illustrates an implementation method in each of tap 1004 and relay 1001.

FIG. 6 illustrates an implementation method in each of tap 1004 and relay 1001. In other words, FIG. 6 illustrates a software structure in each of tap 1004 and relay 1001.

Referring to FIG. 6, the software structure of tap 1004 (remote node) includes a ZigBee application 3401 and a ZigBee protocol stack 3402. ZigBee application 3401 obtains information about power consumption from a microcomputer (not shown) for measuring electric power, and converts the information into a predetermined format. ZigBee application 3401 transmits the information about power consumption in response to an attribute read request from another ZigBee node or spontaneously transmits it in accordance with a set report condition.

Wireless RF integrated communication controller unit 1106 (ZigBee coordinator unit) (local node) of relay 1001 includes a ZigBee application 3111, a ZigBee protocol stack 3112, UART 1166, and an associate device list 3110. ZigBee application 3111 receives the above-described information about power consumption from tap 1004. UART 1166 is an asynchronous transmission/reception interface for communication with control unit 1101 as described above.

ZigBee protocol stack 3112 registers, in associate device list 3110, information about a device associated with the local node. Since associate device list 3110 is stored in the nonvolatile memory (NVRAM), the information is not lost even when the power source is turned off and then turned on again. By reading associate device list 3110, ZigBee manager 3121 obtains the list of devices associated with the local node.

Control unit 1101 of relay 1001 (see FIG. 3) includes a ZigBee manager 3121, a monitor library 3122, a UART 3123, a LED&switch control 3124, a UDP/IP (User Datagram Protocol/Internet Protocol) port (the port number is fixed), and Ethernet 3125. ZigBee manager 3121 is one of applications stored in control unit 1101.

ZigBee manager 3121 manages ZigBee nodes that can be on network Z. Specifically, ZigBee manager 3121 manages wireless RF integrated communication controller unit 1106 (ZigBee coordinator unit) serving as the local node and remote nodes (ZigBee nodes such as taps 1004) capable of communicating with the local node.

When a remote node has joined (participated in) the network and is associated with the local node, the existence information of the remote node is managed as being "existing".

When the remote node has left (withdrawn) from the network and is not associated with the local node, the existence information of the remote node is managed as being "missing". Further, when there is a change in a ZigBee node, ZigBee manager 3121 detects the change and notifies other applications of the change.

In addition, ZigBee manager 3121 obtains general information (IEEE address, short address, MAC capability, logic type, and the like) of the ZigBee nodes from the local node and the remote nodes, and obtains the list of devices associated with the local node and the network information (PanID, logical channel, and the like) at present from the local node and manage them as node information. Moreover, ZigBee manager 3121 monitors LED&switch control 3124. More specifically, ZigBee manager 3121 monitors inputs from push button 1108 and slide switch 1109, has a function of controlling the pairing function (join permitted state) and the leave mode, and controls light emission of LED 1103 (LED 1103c, precisely) in accordance with the state of the relay. ZigBee manager 3121 is in the form of a server, opens a fixed UDP port number, accepts access from other devices, and provides a ZigBee upper layer protocol and a relay discovery protocol.

Monitor library 3122 communicates with wireless RF integrated communication controller unit 1106 by directly exchanging data with UART 3123. Monitor library 3122 transmits and receives data to/from wireless RF integrated communication controller unit 1106 through UART 3123. It should be noted that monitor library 3122 may transmit a command for wireless RF integrated communication controller unit 1106 and transmit a command for tap 1004.

Figure 7:
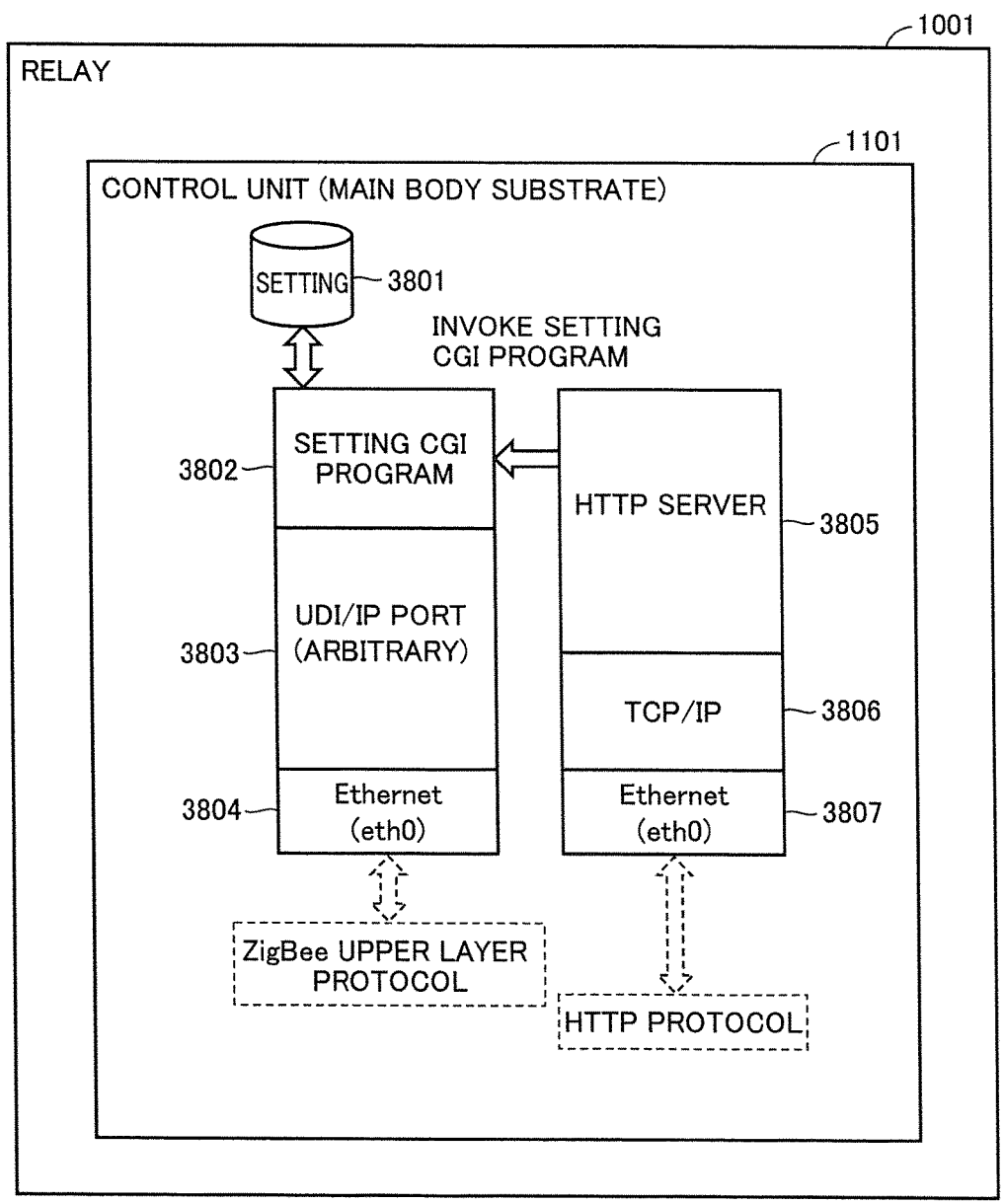
FIG. 7 illustrates a software structure of another application in relay 1001.

FIG. 7 illustrates a software structure of another application in relay 1001.

Referring to FIG. 7, control unit 1101 of relay 1001 includes a HTTP server 3805, TCP/IP 3806, Ethernet 3807, a setting CGI program 3802, a UDP/IP (User Datagram Protocol/Internet Protocol) port (the port number is arbitrary), Ethernet 3804, and setting information 3801.

HTTP server 3805 receives an instruction for setting relay 1001 from an external browser (HTTP client), and invokes setting CGI program 3802.

Setting CGI program 3802 changes settings having influences over various types of programs on the relay, and stores them in setting information 3801. Moreover, setting CGI program 3802 reads information stored in setting information 3801 and provides a response to HTTP server 3805.

With the software structure, a setting screen such as one in FIG. 17 as described below will be displayed on the display of personal computer 1003.

It should be noted that tap information collecting application for collecting information of tap 1004 is also another application stored in control unit 1101.

<E. Operation Process at Relay Side>
<E.1 Push Button Press-Down Process>

Figure 8:
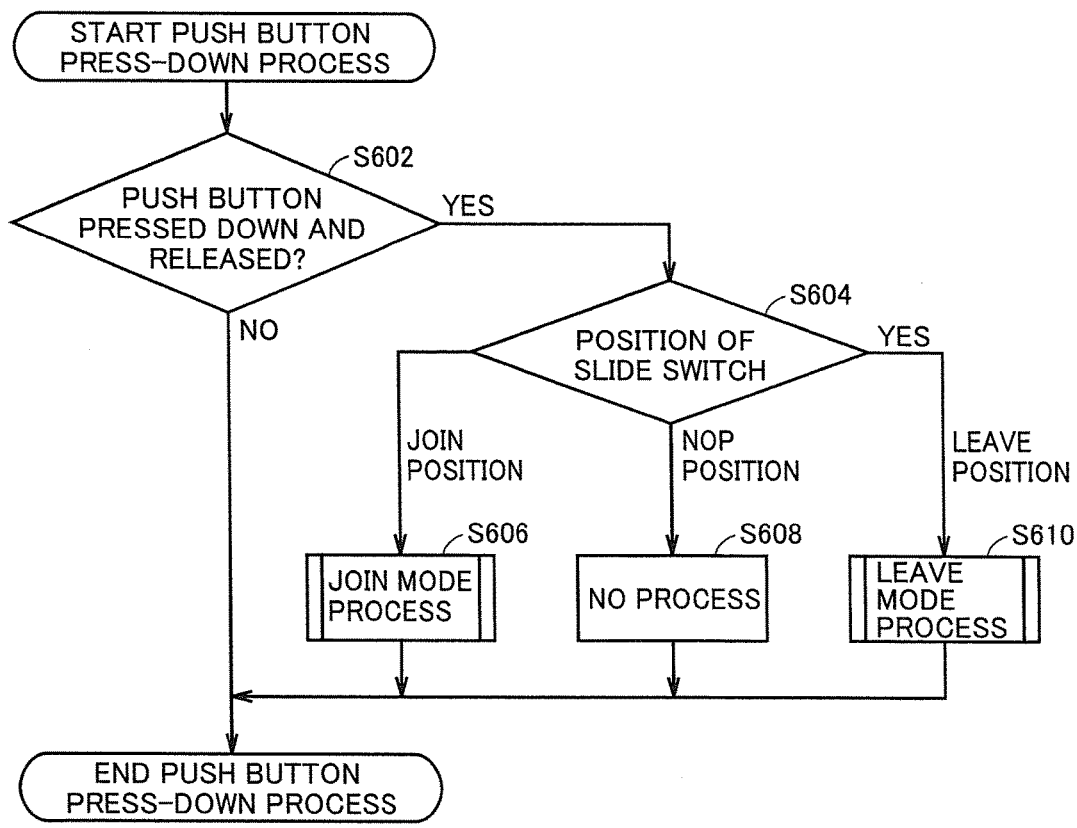
FIG. 8 is a flowchart illustrating a press-down process for a push button of relay 1001 according to the embodiment of the present invention.

FIG. 8 is a flowchart illustrating a press-down process for a push button of relay 1001 according to the embodiment of the present invention. This process is a process performed by ZigBee manager 3121 (control unit 1101) of relay 1001.

Referring to FIG. 8, in a step S602, control unit 1101 first determines whether or not push button 1108 has been pressed down.

When it is determined as NO in step S602, the process is ended (the push button press-down process is ended).

When it is determined as YES in step S602, in a step S604, it is determined which position slide switch 1109 is positioned at.

When it is determined that slide switch 1109 is positioned at the JOIN position in step S604, the join mode process is performed (step S606). Details of the join mode process will be described later.

When it is determined that slide switch 1109 is positioned at the NOP position in step S604, no process is performed (step S608).

When it is determined that slide switch 1109 is positioned at the LEAVE position in step S604, the leave mode process is performed (step S610). Details of the leave mode process will be described later.

Then, the process is ended (the push button press-down process is ended).

<E.2 Join Mode Process>

Figure 9:
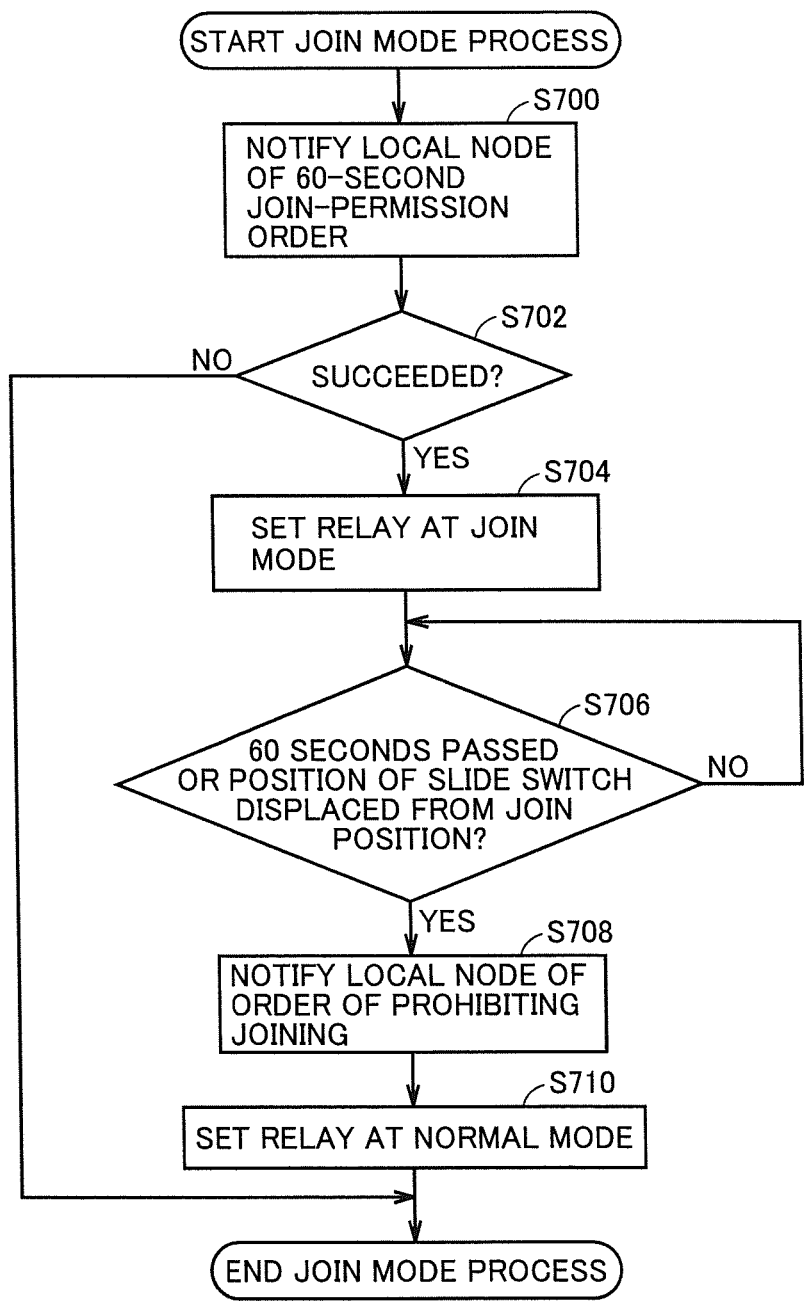
FIG. 9 is a flowchart illustrating a join mode process for relay 1001 according to the embodiment of the present invention.

FIG. 9 is a flowchart illustrating the join mode process of relay 1001 according to the embodiment of the present invention. This process is a process performed by ZigBee manager 3121 (control unit 101) of relay 1001.

Referring to FIG. 9, when the join mode process is started, control unit 1101 first provides wireless RF integrated communication controller unit 1106, which serves as the local node, with a notification regarding a 60-second join-permission order (step S700). The 60-second join-permission order is meant to set the local node at the join permitted state only for 60 seconds. Specifically, the local node is notified of NLME-PERMIT-JOINING.Request (argument: PermitDuration=60).

Next, in a step S702, it is determined whether or not the notification has been succeeded. Specifically, it is determined whether or not wireless RF integrated communication controller unit 1106 has received the notification normally. When it is determined as YES in step S702, relay 1001 is set at the join mode (step S704). In this case, the LED of relay 1001 blinks in a normal manner to notify the user of the change in mode.

Next, in a step S706, it is determined whether 60 seconds have passed or the position of the slide switch has been displaced from the JOIN position. When it is determined as NO in step S706, this state is maintained. In other words, the join permitted state is maintained.

When it is determined as YES in step S706, the local node is notified of an order of prohibiting the joining (step S708). Specifically, control unit 1101 notifies wireless RF integrated communication controller unit 1106, which serves as the local node, of the order of prohibiting the joining. Specifically, the local node is notified of NLME-PERMIT-JOINING.Request (argument: PermitDuration=0).

Then, relay 1001 is set at a normal mode (step S710). In this case, the LED of relay 1001, which is blinking in the normal manner, is lit off to notify the user of the change in mode. In addition, control unit 1101 sets it at the normal mode irrespective of whether the notification of the join prohibited state (NLME-PERMIT-JOINING.Request) to wireless RF integrated communication controller unit 1106 has been succeeded or failed.

Then, the process is ended (the join mode process is ended).

When it is determined as NO in step S702, the process is ended (the join mode process is ended). In step S702, there may occur an unlikely event that the local node does not receive it normally because an internal queue is full or the like. In such a case, the local node cannot be brought into the join permitted state, so that the LED does not blink in the normal manner. This is to prevent the user from being misunderstood that the joining can be performed. Also in step S708, the local node may not receive it normally, but the local node returns to the joining prohibition after passage of 60 seconds because the join permitted period of the local node has been set at 60 seconds in the first place.

Figure 10:
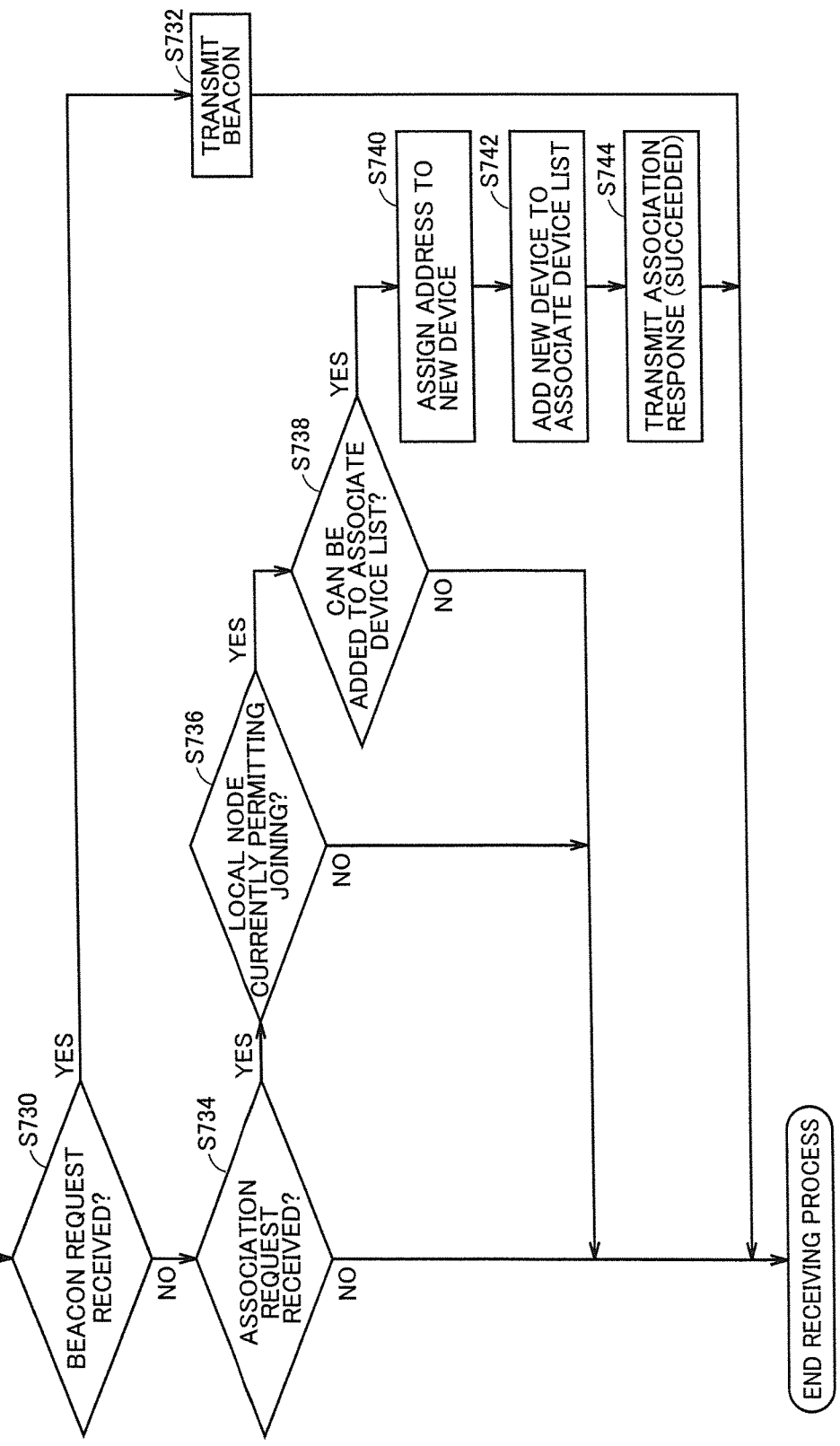
FIG. 10 is a flowchart illustrating a receiving process for a signal from a remote node in the local node of relay 1001 according to the embodiment of the present invention.

FIG. 10 is a flowchart illustrating a process of receiving a signal from the remote node in the local node of relay 1001 according to the embodiment of the present invention. This process is a process performed by ZigBee protocol stack 3112 (wireless RF integrated communication controller unit 1106) of relay 1001.

Referring to FIG. 10, first, in a step S730, wireless RF integrated communication controller unit 1106 determines whether or not a beacon request has been received. When it is determined as YES in step S730, a beacon is transmitted (step S732). Then, the receiving process for the beacon request is ended.

Next, when it is determined as NO in step S730, it is determined in a step S734 whether or not an association request has been received.

When it is determined as YES in step S734, it is determined in a step S736 whether or not the local node is currently permitting the joining.

When it is determined as YES in step S736, it is determined in a step S738 whether or not it can be added to the associate device list. For example, it is determined whether or not the number of devices exceeds the registerable number in the list if added. When the number does not exceed, it is determined that the addition can be performed.

When it is determined as YES in step S738, a short address is assigned to the new device (step S740).

Then, the device information of the new device is added to the associate device list (step S742). As the device information, an IEEE address, a short address, a node relation, and the like are registered.

Next, an association response (succeeded) is transmitted to the one having transmitted the association request (step S744). The association response (succeeded) includes the assigned short address and the like.

Then, the process is ended (the receiving process is ended).

It should be noted that when it is determined as NO in step S734, when it is determined as NO in step S736, or when it is determined as NO in step S738, the process is ended (the receiving process is ended).

<E.3 Leave Mode Process>

Figure 11:
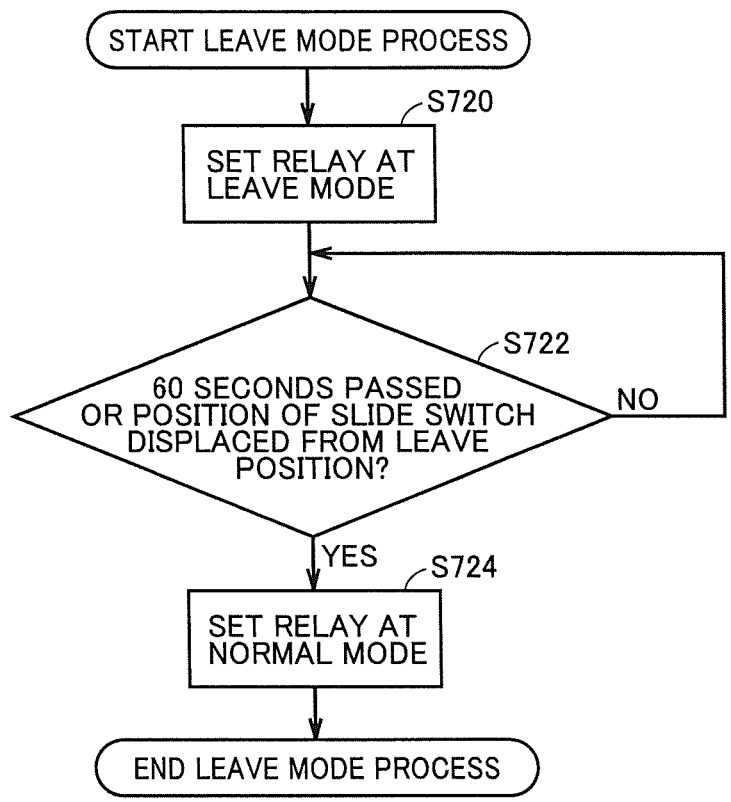
FIG. 11 is a flowchart illustrating a leave mode process for relay 1001 according to the embodiment of the present invention.

FIG. 11 is a flowchart illustrating the leave mode process in relay 1001 according to the embodiment of the present invention. This process is a process performed by ZigBee manager 3121 (control unit 1101) of relay 1001.

Referring to FIG. 11, when starting the leave mode process, control unit 1101 sets relay 1001 at the leave mode (step S720). In this case, the LED of relay 1001 blinks at a high speed to notify the user of the change in mode. Although described later, when the setting button of tap 1004 is pressed down, a predetermined signal will be transmitted through unicasting. Tap 1004 transmits "Device Annce", which is defined as the predetermined signal in the ZigBee specification. In the description below, the "Device Annce" is also described as "device annce". Then, relay 1001 receives the device annce and starts a device annce receiving process. It should be noted that setting the relay at "the leave mode" is performed inside ZigBee manager 3121. This does not mean that an order is provided to the local node.

Figure 12:
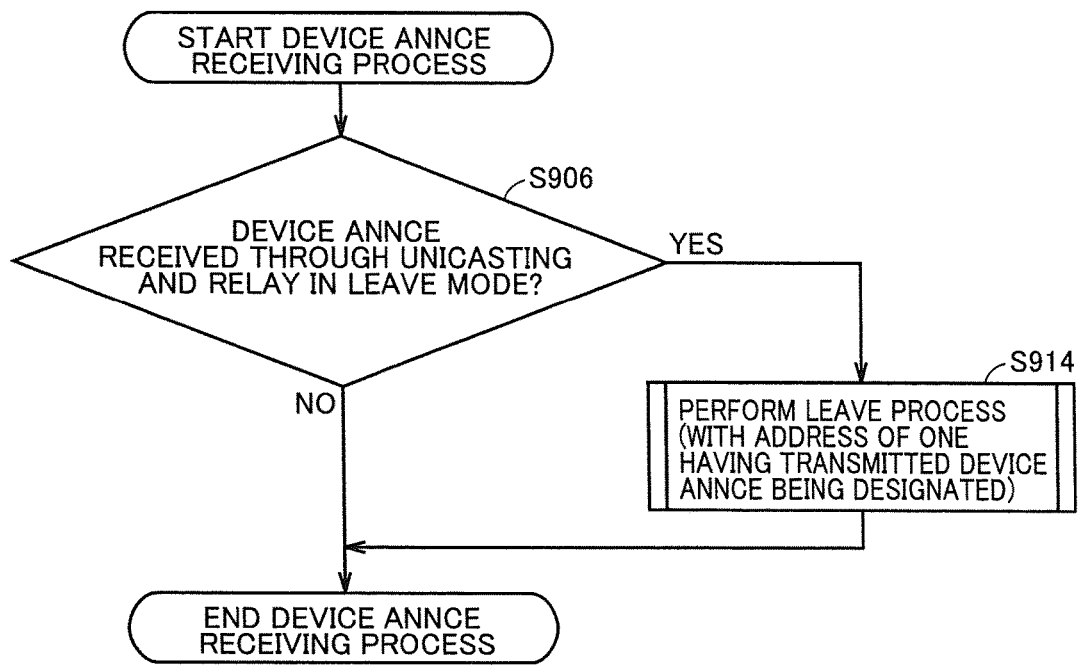
FIG. 12 is a flowchart illustrating a device annce receiving process in the leave mode in relay 1001 according to the embodiment of the present invention.

FIG. 12 is a flowchart illustrating the device annce receiving process in the leave mode of relay 1001 according to the embodiment of the present invention. This process is a process performed by ZigBee manager 3121 (control unit 1101) of relay 1001.

Referring to FIG. 12, when control unit 1101 receives the device annce, control unit 1101 determines in a step S906 whether or not the device annce has been received through unicasting and the relay is in the leave mode.

When it is determined as YES in step S906, the leave process is performed (with the address of the one having transmitted the device annce being designated) (step S914). The leave process will be described later.

Then, the process is ended (the device annce receiving process is ended). When it is determined as NO in step S906, the process is ended (the device annce receiving process is ended).

Referring to FIG. 11 again, in step S722, it is determined whether 60 seconds have passed or the position of the slide switch has been displaced from the LEAVE position.

When it is determined as NO in step S722, the leave mode is maintained.

When it is determined as YES in step S722, relay 1001 is set at the normal mode (step S724). In this case, the LED of relay 1001, which is blinking at a high speed, is lit off to notify the user of the change in mode.

Then, the process is ended (the leave mode process is ended).

Figure 13:
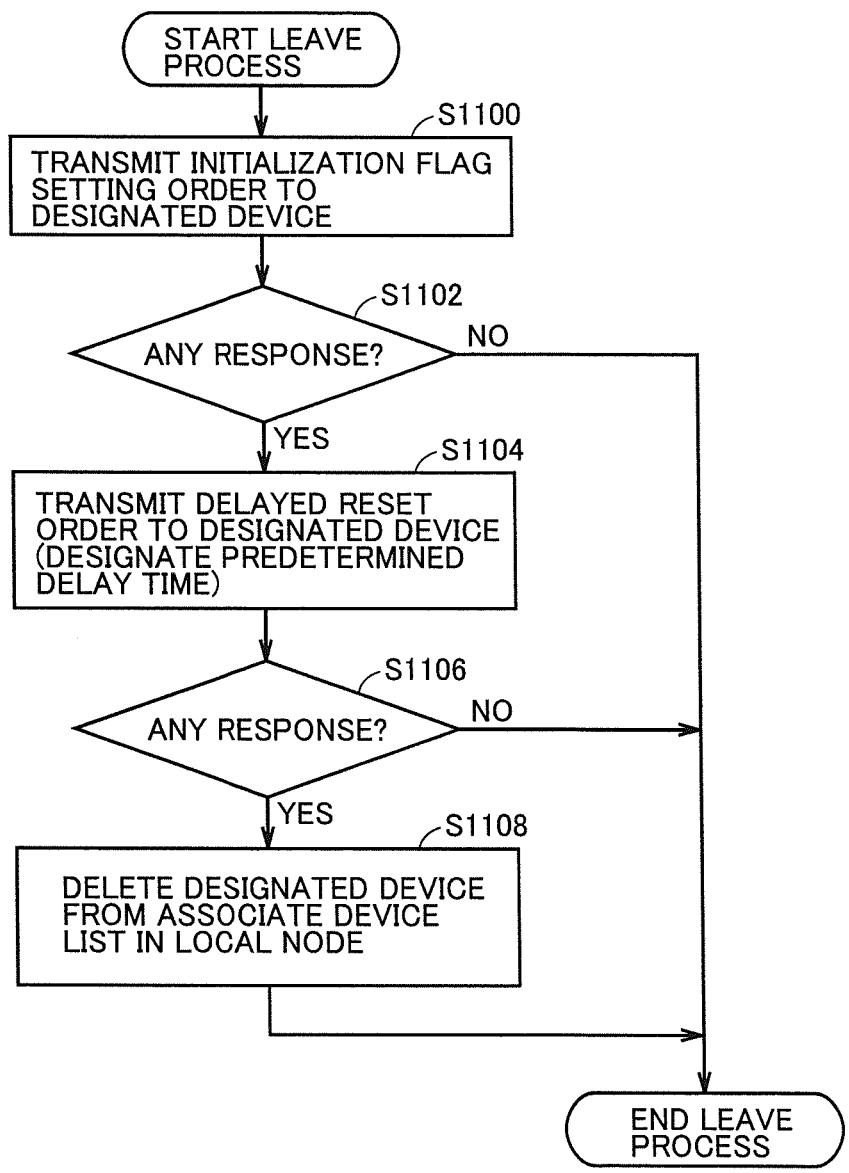
FIG. 13 is a flowchart illustrating the leave process in relay 1001 according to the embodiment of the present invention.

FIG. 13 is a flowchart illustrating the leave process in relay 1001 according to the embodiment of the present invention. This process is a process performed by ZigBee manager 3121 (control unit 1101) of relay 1001.

Referring to FIG. 13, first, an initialization flag setting order is transmitted to a designated device (step S1100). The initialization flag is a flag defining to bring it to the initialized state (factory settings). The initialization flag setting order is an instruction for making a request to set a flag for part of data of the configuration information registered in tap 1004. The startup process after resetting is changed depending on whether the flag has been set or not. Specifically, when the initialization flag has not been set, the startup process is performed with the data, such as the network information registered in tap 1004, being maintained. On the other hand, when the initialization flag has been set, the startup process is performed with the data, such as the network information registered in tap 1004, being brought back to the initial values in the factory settings.

Next, in a step S1102, it is determined whether or not a response to the initialization flag setting order has been received.

When it is determined as YES in step S1102, the process proceeds to a step S1104.

In step S1104, a delayed reset order is transmitted to the designated device.

The delayed reset order is a reset order capable of designating extension of time (delay time) until resetting. In the present example, a predetermined delay time (200 ms as one example) is designated and the delayed reset order is transmitted. This is in consideration of time taken for tap 1004 to return a response to the delayed reset order.

Next, in a step S1106, it is determined whether or not the response to the delayed reset order has been received from tap 1004 to which the reset order has been transmitted.

When it is determined as YES in step S1106, the information about the designated device is deleted from the associate device list in the local node (step S1108).

Specifically, the information about the designated device (such as an IEEE address, a short address, a node relation, and the like) is deleted.

Then, the process is ended (the leave process is ended).

Meanwhile, when it is determined as NO in step S1102, it is unknown whether or not the order has been surely received by tap 1004, so that the process is discontinued and ended (the leave process is ended).

Meanwhile, when it is determined as NO in step S1106, it is unknown whether or not the reset order has been surely received by tap 1004, so that the process is discontinued and is ended without deletion from the associate device list (the leave process is ended).

To summarize, when no response is received, it is determined that tap 1004 has not been left and the information about the tap is not deleted from the associate device list of the local node in relay 1001. When the response is received, it is determined that tap 1004 has been left and the information about the tap is deleted from the associate device list of the local node in relay 1001. In this way, the leave process can be performed while keeping consistency between relay 1001 and tap 1004.

In FIG. 13, the designations in step S1100 and step S1104 can be collectively transmitted as one packet. In this case, one packet including both the order for setting the initialization flag and the order for delayed reset is transmitted to the designated device.

<F. Operation Process at Tap Side>
<F.1 Process after Power Activation>

First, a process after power activation will be described.

Figure 14:
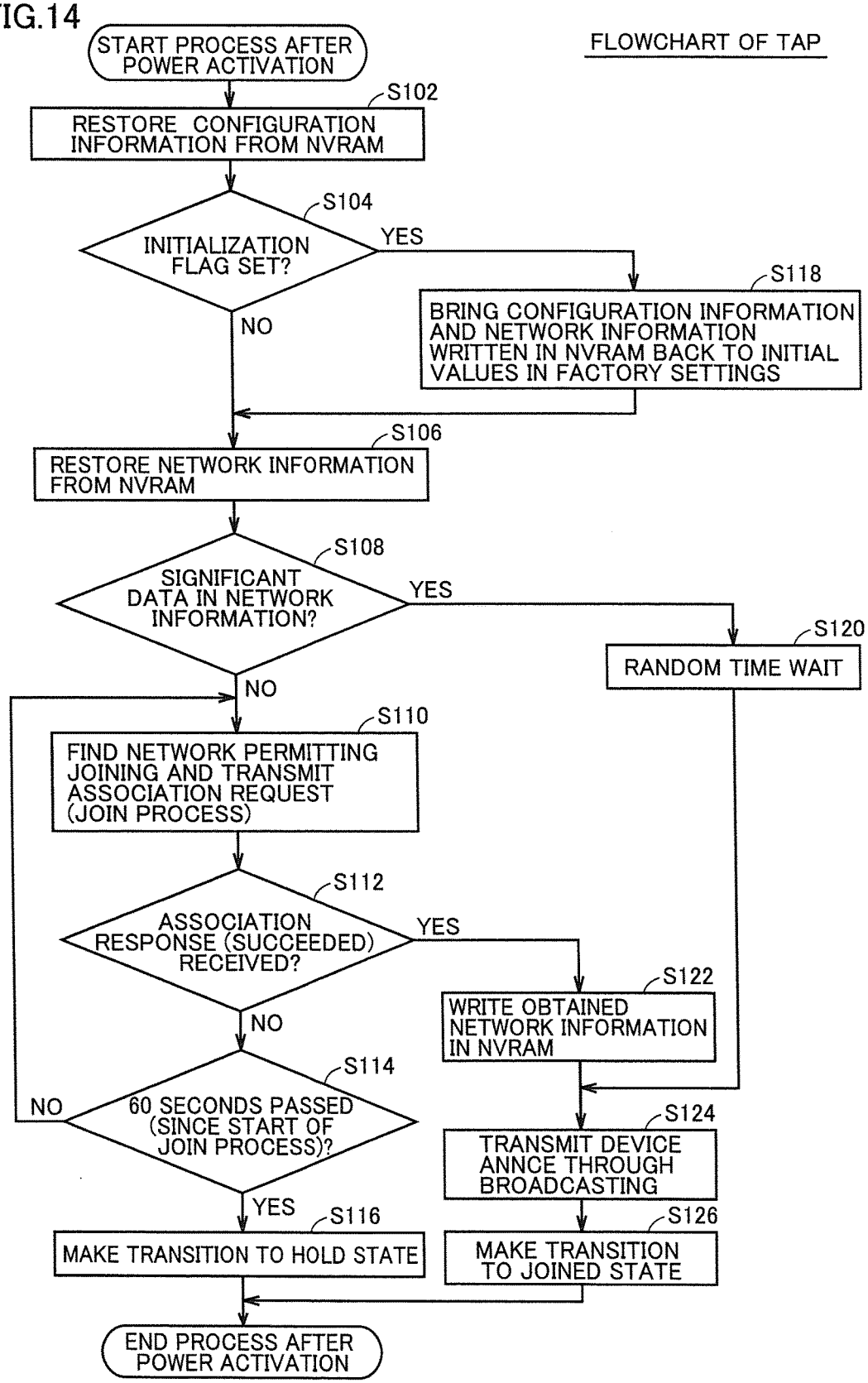
FIG. 14 is a flowchart illustrating a process after power activation at the tap side according to the embodiment of the present invention.

FIG. 14 is a flowchart illustrating the process after power activation at the tap side according to the embodiment of the present invention. The process is a process mainly performed by CPU 2121.

Referring to FIG. 14, when powered on, CPU 2121 first restores the configuration information stored in the NVRAM (step S102).

Next, in a step S104, it is determined whether or not the initialization flag included in the configuration information has been set.

When it is determined as NO in step S104, the process proceeds to a step S106.

On the other hand, when it is determined as YES in step S104, a process is performed to bring the configuration information and the network information written in the NVRAM back to the initial values in the factory settings (step S118).

Next, the network information stored in the NVRAM is restored (step S106).

Next, in a step S108, it is determined whether or not there is significant data in the network information.

When it is determined as YES in step S108, random time standby (wait) is performed (step S120). Then, the device annce is transmitted through broadcasting (step S124). With the random time standby, it can be expected that the timing of transmitting the device annce through broadcasting is shifted to prevent collision when the power sources for the plurality of taps are turned on at the same time.

On the other hand, when it is determined as NO in step S108, a network permitting joining is found and an association request is transmitted (join process) (step S110).

Specifically, tap 1004 transmits a beacon request and receives a beacon. The beacon is transmitted from relay 1001 (that is a ZigBee coordinator) and other taps (that are ZigBee routers). Tap 1004 analyzes the received beacon, selects the optimum one of networks permitting the joining, and transmits an association request (NLME-JOIN.Request) (joining is attempted). It should be noted that the process at the relay 1001 side has been illustrated in FIG. 10, and the process is performed mainly in protocol stack 3112 of the ZigBee coordinator unit. It should be noted that during the join process, tap 1004 maintains the LED to blink in the normal manner.

Next, in a step S112, it is determined whether or not the association response (succeeded) has been received.

When it is determined as YES in step S112, the obtained network information is written in the NVRAM (step S122). The network information includes a PanID, an Extended PanID, a logical channel, and the like. Moreover, a short address assigned to tap 1004 is also included therein.

Then, the device annce is transmitted through broadcasting (step S124).

Then, transition is made to the joined state (step S126). When brought into the joined state, the LED is lit off.

Then, the process is ended (the process after power activation is ended).

Meanwhile, when it is determined as NO in step S112, it is determined in a step S114 whether or not 60 seconds have passed since the start of the join process.

When it is determined as NO in step S114, the process goes back to step S110 and the join process is continued.

On the other hand, when it is determined as YES in step S114, transition is made to a hold state (step S116). The hold state refers to a state in which the tap does not participate in a network after resetting it. On this occasion, transmission/reception of a packet is not performed at all. On this occasion, the LED blinks at a high speed. Although described below, when the setting button is pressed down during the hold state, the hold state is canceled and the process is brought back to step S110.

Then, the process is ended (the process after power activation is ended).

<F.2 Process after Pressing down Setting Button>

Figure 15:
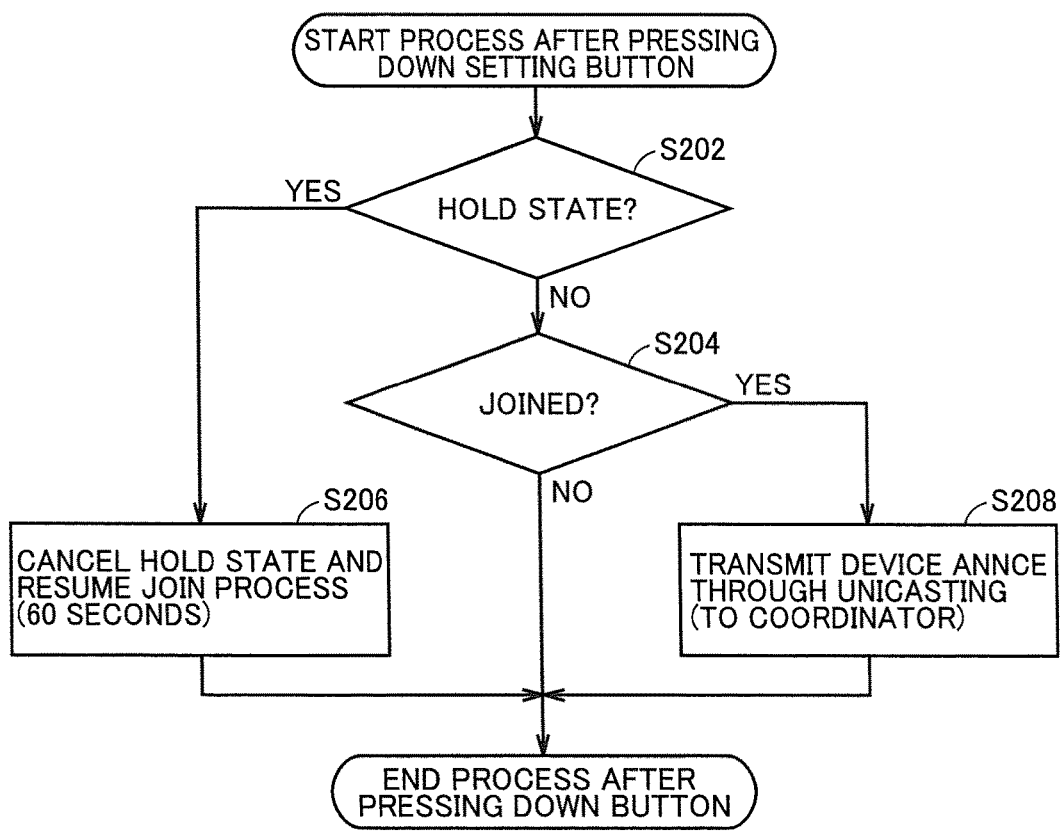
FIG. 15 is a flowchart illustrating a process after pressing down the setting button at the tap side according to the embodiment of the present invention.

FIG. 15 is a flowchart illustrating a process after pressing down the setting button at the tap side according to the embodiment of the present invention. The process is a process mainly performed by CPU 2121.

Referring to FIG. 15, when the setting button is pressed down, it is first determined in a step S202 whether or not the tap is in the hold state.

When it is determined as YES in step S202, the hold state is canceled and the join process is resumed (step S206). In other words, the process proceeds to step S110 of FIG. 14.

Then, the process is ended (the process after pressing down the button is ended).

When it is determined as NO in step S202, it is next determined in a step S204 whether or not the joining has been done.

When it is determined as YES in step S204, the device annce is transmitted through unicasting (to the coordinator of relay 1001) (step S208). Here, for the unicast transmission, the destination address is set at the address of wireless RF integrated communication controller unit 1106 of relay 1001 (ZigBee coordinator unit (short address=0x0000)). On this occasion, the LED blinks instantaneously.

Then, the process is ended (the process after pressing down the button is ended).

When it is determined as NO in step S204, the process is ended without any operation (the process after pressing down the button is ended).

<F.3 Packet Receiving Process>

Figure 16:
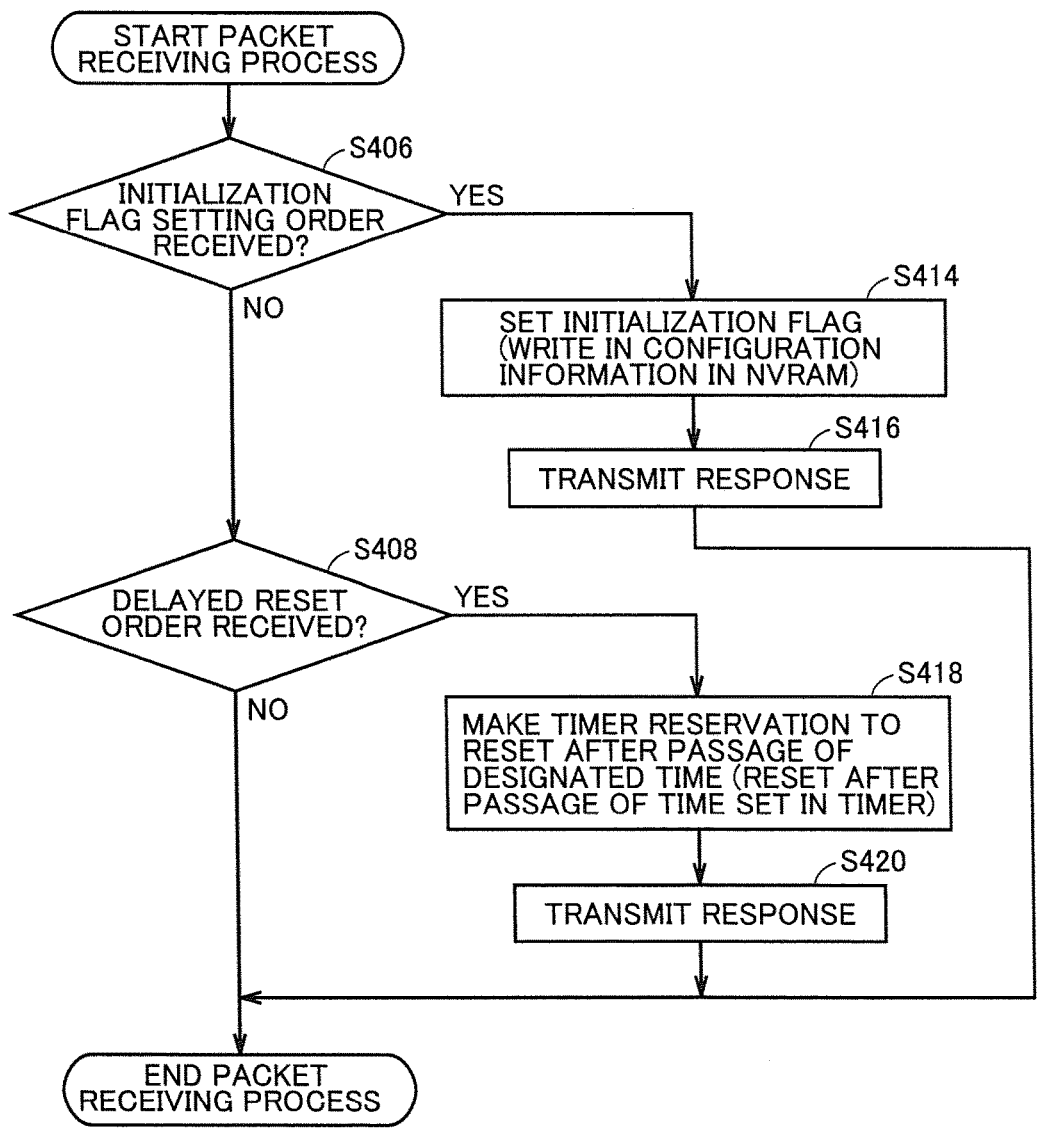
FIG. 16 is a flowchart illustrating a packet receiving process at the tap side according to the embodiment of the present invention.

FIG. 16 is a flowchart illustrating a packet receiving process at the tap side according to the embodiment of the present invention.

Referring to FIG. 16, in a step S406, it is first determined whether or not the initialization flag setting order has been received.

When it is determined as YES in step S406, an initialization flag is set (written in the configuration information in the NVRAM) (step S414).

Then, a response to the setting order is transmitted (step S416).

Then, the process is ended (the packet receiving process is ended).

Moreover, when it is determined as NO in step S406, it is then determined in a step S408 whether or not a delayed reset order has been received.

When it is determined as YES in step S408, timer reservation is made to reset after passage of designated time (step S418).

Then, a response to the reset order is transmitted (step S420). Then, when the time set in the timer has passed, tap 1004 is reset (i.e., restarted).

Then, the process is ended (the packet receiving process is ended).

When it is determined as NO in step S408, the process is ended (the packet receiving process is ended).

With the process, the tap is reset after passage of the time set in the timer and the initialization flag is set. Accordingly, the process is performed to bring the configuration information and the network information written in the NVRAM of tap 1004 back to the initial values in the factory settings.

In the leave process according to the present embodiment, when push button 1108 of relay 1001 is pressed down and slide switch 1109 of relay 1001 is positioned at the LEAVE position, the leave mode is started. Further, when the setting button of tap 1004 having joined is pressed down, the device annce is transmitted from tap 1004 to relay 1001 through unicasting. When the device annce is received through unicasting while the relay is in the leave mode, relay 1001 designates the address of the device having transmitted the device annce and starts the leave process.

With the start of the leave process in relay 1001, the initialization flag setting order is transmitted to the device designated by relay 1001. In accordance with the order, the designated device sets the initialization flag, which is part of the configuration information. Then, relay 1001 transmits the delayed reset order to the designated device when there is a response to the initialization flag setting order from the designated device. The designated device is reset after passage of time set in the timer in accordance with the delayed reset order. After restarting, in accordance with the initialization flag that is part of the configuration information, the process is performed to bring the configuration information and the network information, which are written in the NVRAM, back to the initial values in the factory settings. Further, the designated device transmits, to relay 1001, a response indicating that the delayed reset order has been received. When relay 1001 receives the response indicating that the delayed reset order has been received from the designated device, the device information about the designated device is deleted from the associate device list.

Thus, in the leave mode, relay 1001 specifies tap 1004 to leave, in accordance with the device annce from tap 1004.

Then, relay 1001 transmits the initialization flag setting order, and transmits the delayed reset order if there is a response. With this flow, the network information and the configuration information of tap 1004 are reset to the factory settings. Further, when there is a response to the delayed reset order from tap 1004, the setting information, such as the network information and the configuration information, necessary for communication connection in the network is deleted in relay 1001. Thus, the setting information necessary for the communication connection is deleted from both the tap and the relay when the exchange of information is checked such that there is no inconsistency between the control device and each tap and it is confirmed that there is no inconsistency therebetween. Accordingly, the information can be prevented from remaining in one of the devices to presumably result in unnecessary traffic on the network.

In other words, with such a simple operation that the leave mode is started in relay 1001 and the setting button of the tap is pressed down, each tap can be withdrawn from the network without inconsistency between the control device and the tap.

It should be noted that although the device annce is transmitted through unicasting (to the coordinator) in step S208 of FIG. 15, there is no special design intention in performing the unicast transmission of the device annce. Some packet (packet explicitly or implicitly indicating that the button has been pressed) other than the device annce may be transmitted. In this case, the configuration of FIG. 13 is modified correspondingly. It should be noted that the device annce is transmitted because it is general to transmit a device annce through broadcasting when there is a certain state change of node in ZigBee.

(Modification 1)

Figure 17:
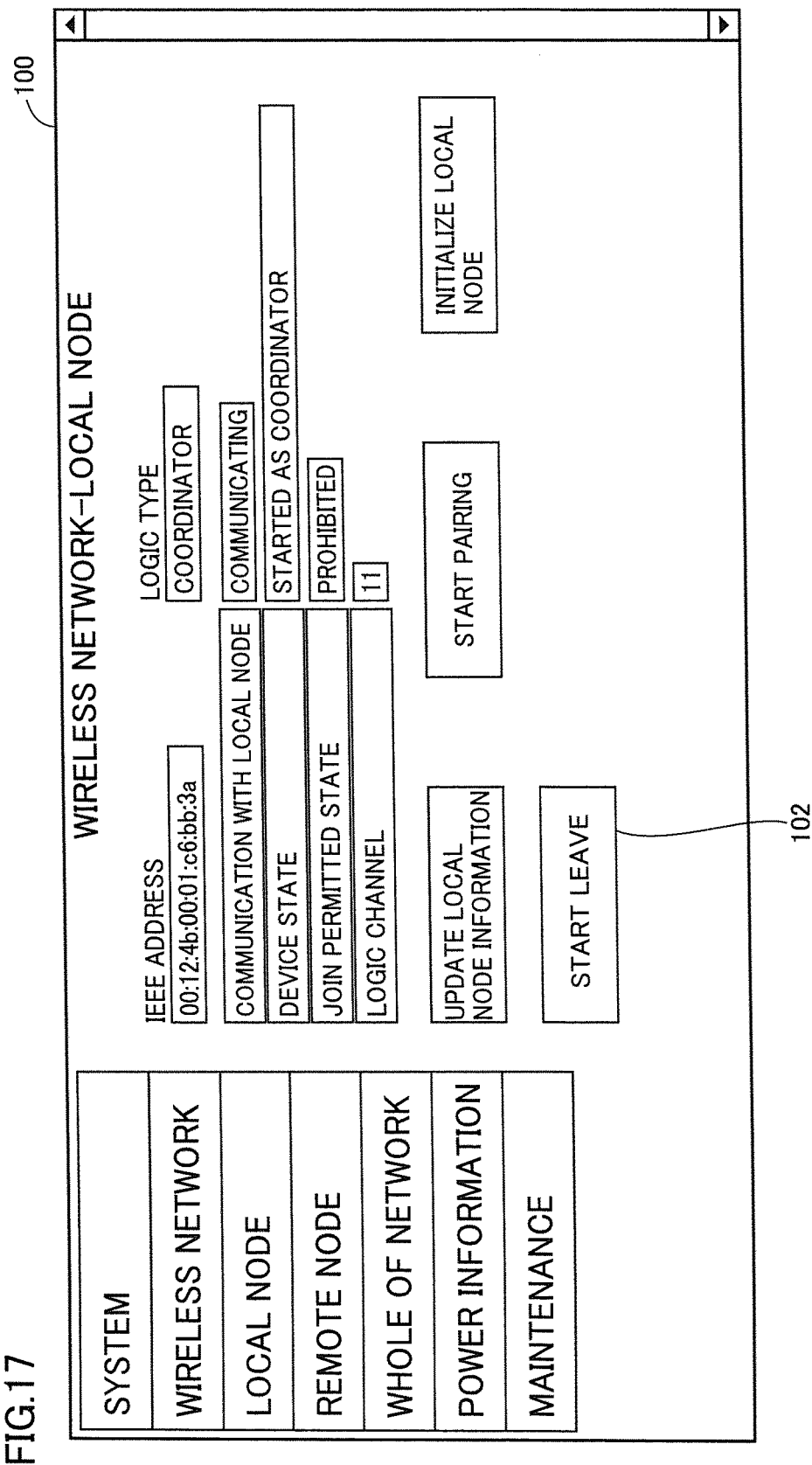
FIG. 17 illustrates an exemplary setting screen 100 for relay 1001, which is displayed on a display of a personal computer 1003 according to a modification 1 of the embodiment of the present invention.

FIG. 17 illustrates an exemplary setting screen 100 for relay 1001, which is displayed on the display of personal computer 1003 according to a modification 1 of the embodiment of the present invention.

FIG. 17 shows that setting screen 100 for making various types of settings is displayed by communicating with the HTTP server of relay 1001 via the browser of personal computer 1003.

In the setting screen, the user can cause displaying of various types of information about the system, the wireless network, the local node (relay 1001), the remote node (tap 1004), the whole of network, the power information, and maintenance. In the present example, the information about the local node is displayed as an example. For example, the network information (IEEE address) of the local node and the state of the node are displayed.

Here, the setting screen is also provided as an interface screen for providing an instruction to the local node (relay 1001).

Specifically, the setting screen shows that a leave starting button 102 is provided. This button 102 is a button capable of instructing start of execution of the leave mode in relay 1001.

When the user selects the button, personal computer 1003 instructs the local node (relay 1001) to start the leave mode.

Relay 1001 starts the leave mode in response to the instruction.

Although it has illustrated in the description above that the leave mode is started when push button 1108 provided in relay 1001 is pressed down and slide switch 1109 is positioned at the LEAVE position, the leave mode process illustrated with reference to FIG. 11 and subsequent figures can be started by the user selecting leave starting button 102 provided in the setting screen displayed on the display of personal computer 1003.

Further, the leave process at the tap side as illustrated with reference to FIG. 15 and subsequent figures is performed by pressing setting button 2106 in tap 1004 during the leave mode.

With this process, the leave mode can be started using the setting screen displayed on the display of personal computer 1003 without the user directly operating slide switch 1109 of relay 1001 or the like. Accordingly, each of the taps can be withdrawn from the network in a more simplified manner without inconsistency between the control device and the tap.

(Modification 2)

In the description above, it has been illustrated that by starting the leave mode in relay 1001 and operating setting button 2106 of tap 1004, the leave process is performed between relay 1001 and the operated tap 1004.

The leave process may be performed without operating tap 1004, by designating the tap to leave using the setting screen displayed on the display of personal computer 1003.

Figure 18:
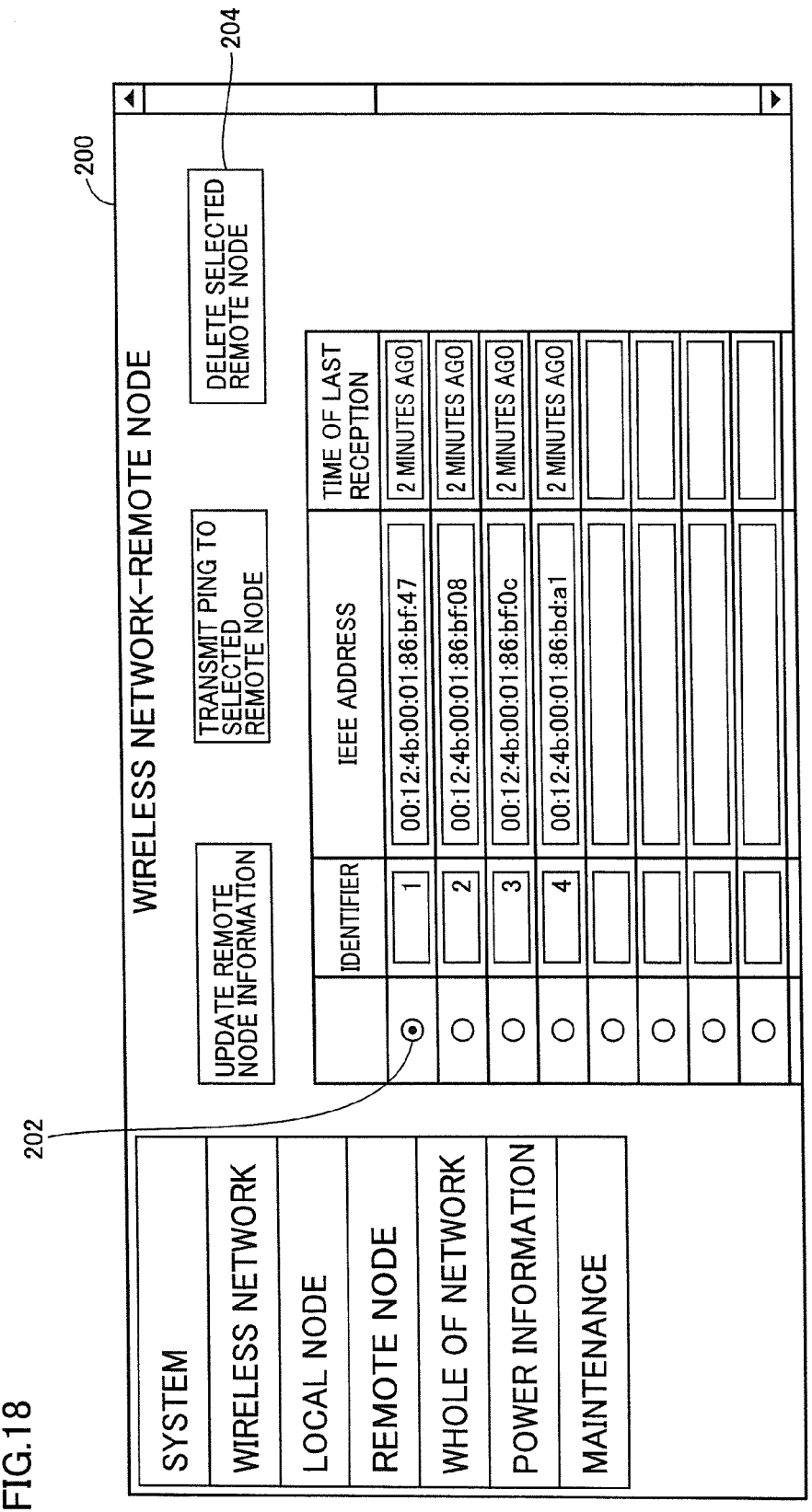
FIG. 18 illustrates a remote node selection screen according to a modification 2 of the embodiment of the present invention.

FIG. 18 illustrates a remote node selection screen according to a modification 2 of the embodiment of the present invention.

FIG. 18 illustrates that a list of a plurality of registered remote nodes (taps 1004) included in the network is displayed. Specifically, it is illustrated that four remote nodes (taps 1004) are registered.

Each of the remote nodes (taps 1004) is assigned an identifier and an IEEE address. There is shown the time of last reception of data from the remote node (tap 1004) during communication between the remote node (tap 1004) and the local node (relay 1001).

Here, radio buttons 202 for the respective remote nodes (taps 1004) displayed in the list are provided to select the remote nodes (taps 1004).

In the present example, it is illustrated that a radio button for a remote node (tap 1004) with an identifier "1" is selected.

Further, it is illustrated that a deletion button 204 for a selected remote node is provided.

Deletion button 204 for the selected remote node is a button to instruct deletion (leave process) of the selected remote node (tap 1004) in relay 1001.

When the user selects the button, personal computer 1003 instructs relay 1001 to perform the leave process with respect to the selected remote node (tap 1004).

Figure 19:
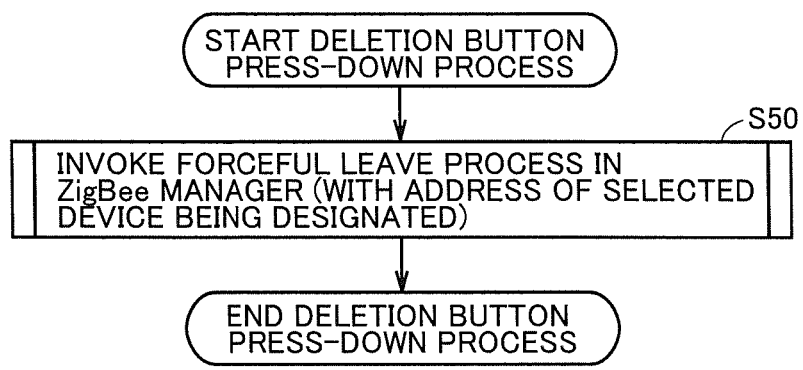
FIG. 19 is a flowchart illustrating a process flow of performing the leave process by selecting a tap in the remote node selection screen according to modification 2 of the embodiment of the present invention.

FIG. 19 is a flowchart illustrating a process flow in which the leave process is performed by selecting a tap in the remote node selection screen according to modification 2 of the embodiment of the present invention. This process is a process performed in control unit 1101 of relay 1001 (specifically, HTTP server 3805 and setting CGI program 3802).

When control unit 1101 receives an instruction (deletion button press-down instruction) from personal computer 1003 to delete the remote node, the deletion button press-down process shown in the figure is started.

Referring to FIG. 19, in the remote node selection screen, the address of the selected device is designated and a forceful leave process by the ZigBee manager is invoked (step S50). The forceful leave process will be described later.

Then, the process is ended (the deletion button press-down process is ended).

Figure 20:
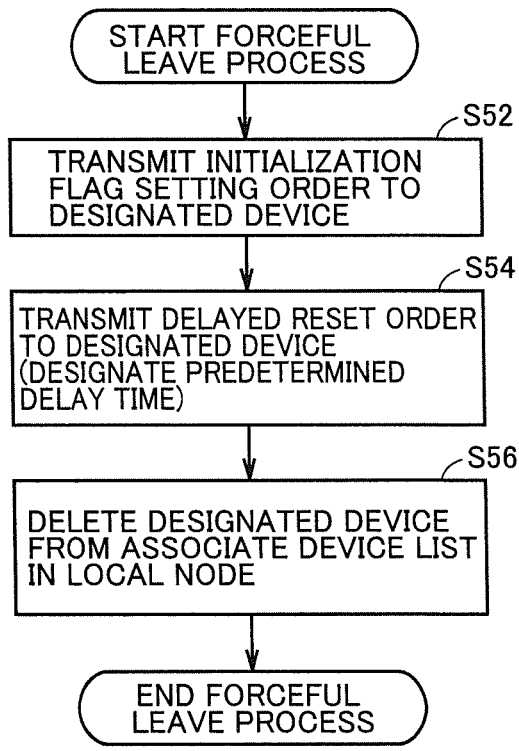
FIG. 20 is a flowchart illustrating a forceful leave process according to modification 2 of the embodiment of the present invention.

FIG. 20 is a flowchart illustrating the forceful leave process according to modification 2 of the embodiment of the present invention. This process is a process performed by ZigBee manager 3121 of relay 1001.

Referring to FIG. 20, an initialization flag setting order is first transmitted to the designated device (step S52).

Next, in a step S54, a delayed reset order is transmitted to the designated device (step S54). In other words, the designated device is requested to be reset after passage of designated time. One example of such a predetermined delay time is 200 ms.

Next, the information about the designated device is deleted from the associate device list in the local node (step S56). Specifically, the information about the designated device (such as the IEEE address, the short address, the node relation, and the like) is deleted.

Then, the process is ended (the forceful leave is ended).

In the present example, even when there is no response from the tap to the request signal for setting the initialization flag or there is no response from the tap to the delayed reset order, the information about the designated device is deleted from the associate device list in which the device is registered as the tap. This is due to the following reason. That is, inconsistency between the control device and the tap can be eliminated by deleting it from the associate device list also when the tap has been already withdrawn from the network and the information about the tap remains only in relay 1001.

However, when the network information is stored in the tap and there is no response from the tap, there may occur inconsistency between the control device and the tap. (In other words, the tap does not delete the network information, but relay 1001 deletes the device information of the tap.) In consideration of this case, the "invoking of the leave process" in step S914 of FIG. 12 may be employed in step S50 of FIG. 19 instead of the "invoking of the forceful leave process". If the leave process is failed, CGI program 3802 provides the one (HTTP server 3805) having invoked with a reply indicating that the leave process has been failed. In doing so, a message is displayed on the screen of FIG. 18 to notify the user that the leave process has been failed.

Moreover, the user may be permitted to make a selection between the "invoking of the leave process" and the "invoking of the forceful leave process". As described above, when the tap has been already withdrawn from the network, there may be a case where the device information of the tap needs to be deleted only from relay 1001.

Specifically, in the description above, it has been illustrated that the leave mode is started by pressing down push button 1108 of relay 1001 and positioning slide switch 1109 at the LEAVE position, but the leave process can be performed when the user selects and designates a tap to leave by using the setting screen displayed on the display of personal computer 1003.

With the process, even when the user does not operate relay 1001 and tap 1004, the leave process can be performed by using the setting screen displayed on the display of personal computer 1003.

Other Embodiment

In the above-described configuration, there has been illustrated the method of performing the leave process by transmitting the reset order from relay 1001 to tap 1004, but there can be employed a method of performing the leave process in accordance with only the operation of tap 1004.

Figure 21:
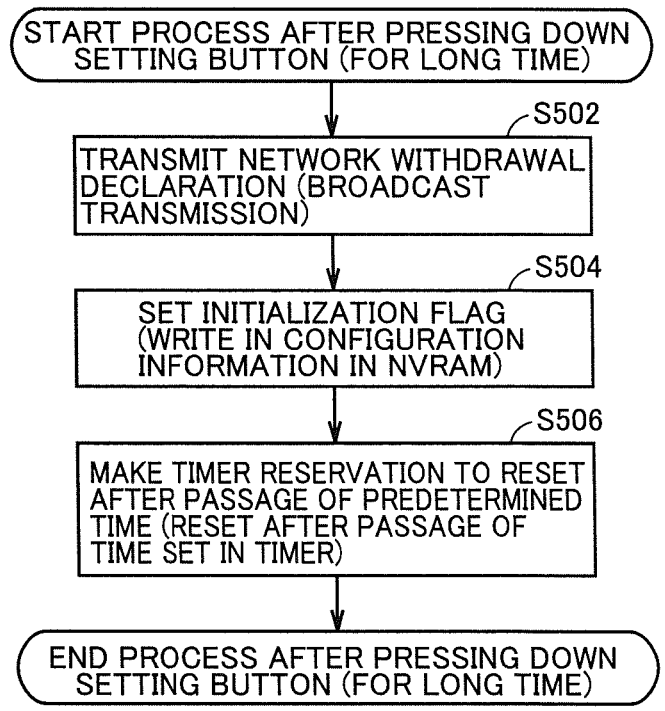
FIG. 21 is a flowchart illustrating a process when pressing a setting button of tap 1004 for a long time according to the embodiment of the present invention.

FIG. 21 is a flowchart illustrating a process when pressing the setting button in tap 1004 for a long time according to the embodiment of the present invention. The process is a process mainly performed by CPU 2121.

Referring to FIG. 21, when the setting button is pressed down (for a long time), this process (process after pressing down the setting button (for a long time)) is started.

First, a network withdrawal declaration signal is transmitted (step S502). Specifically, a signal (NLME-LEAVE.request(DeviceAddress=NULL)) is transmitted to relay 1001 so as to declare disconnection (withdrawal) of tap 1004 from the network.

The other nodes having received this signal deletes the information about the node having made the withdrawal declaration.

Next, the initialization flag is set (step S504). Specifically, the initialization flag is written in the configuration information in the NVRAM.

Then, timer reservation is made to reset it after passage of predetermined time (step S506). One example of such a predetermined time is 200 ms.

Then, the process is ended (the process after pressing down the setting button (for a long time) is ended).

In this process, by pressing setting button 2106 of tap 1004 for a long time, the initialization flag is set and the reset order is received, thus performing a reset process (reconfiguring process) of bringing tap 1004 back to the initial state in the factory settings or the like for the purpose of settings. In addition, the withdrawal declaration signal is transmitted to relay 1001 so as to request the withdrawal of tap 1004 from the network.

Figure 22:
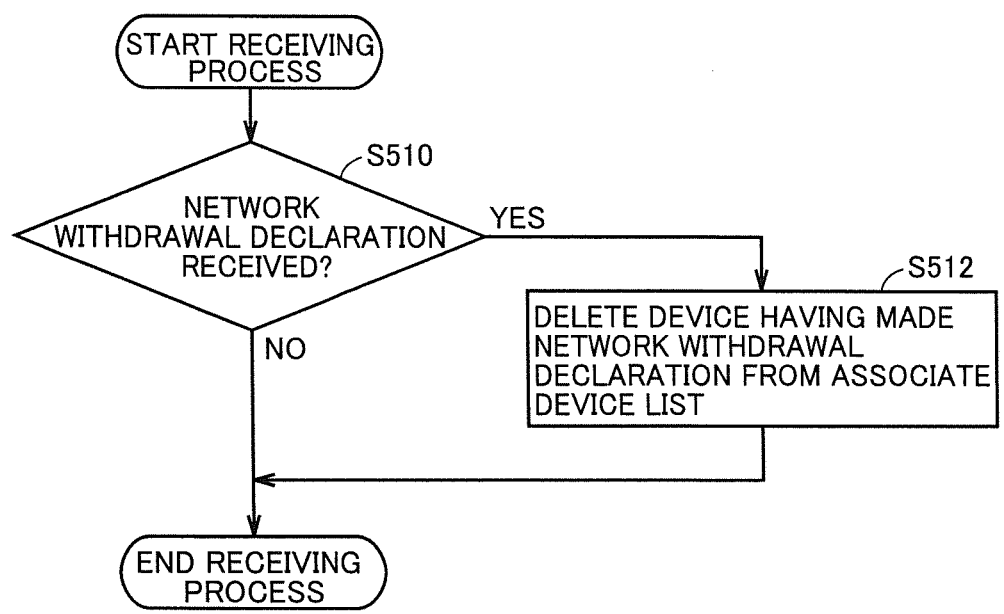
FIG. 22 is a flowchart illustrating a process when receiving a network withdrawal declaration signal transmitted from tap 1004 according to the embodiment of the present invention.

FIG. 22 is a flowchart illustrating a process when receiving the network withdrawal declaration signal transmitted from tap 1004 according to the embodiment of the present invention.

Referring to FIG. 22, relay 1001 determines whether or not relay 1001 has received the withdrawal declaration signal from tap 1004 (step S510).

In step S510, when receiving the withdrawal declaration signal from tap 1004 (YES in step S510), the information about the device (tap) having made the network withdrawal declaration is deleted from the associate device list (step S512).

Then, the process is ended (the receiving process is ended).

Further, in step S510, when the withdrawal declaration signal is not received from tap 1004 (NO in step S510), the process is ended (the receiving process is ended).

With the process, by the user operating only tap 1004, not only the reset process can be performed to bring the data of the network information and the like registered in tap 1004 into the initialized state (the factory settings or the like), but also the leave process can be performed at the relay 1001 side. Hence, each tap can be withdrawn in a simplified manner from the network without inconsistency between the control device and each tap.

Modification of Other Embodiment

Referring to FIG. 21, when the setting button is pressed down (for a long time), the process of FIG. 21 is started, but tap 1004 may start the process of FIG. 21 by receiving a packet that provides an effect similar to the "pressing of the setting button for a long time". In this case, relay 1001 designates a tap 1004 and transmits to tap 1004 a packet that provides an effect similar to the "pressing of the setting button for a long time". Tap 1004 is designed to start the process of FIG. 21 by receiving the packet. (As one example, a Toggle command in an ON/OFF cluster can be used. Tap 1004 is designed in advance to perform an operation similar to the "pressing of the setting button for a long time" when the Toggle command in the ON/OFF cluster is received.) In this technique, a tap to leave is designated from the control device and the tap then leaves. In this embodiment, tap 1004 leaves autonomously. That is, relay 1001 advises a tap 1004 to autonomously make a "withdrawal declaration". Also in such an example, the tap can be withdrawn from the network without inconsistency between the control device and the tap.

Heretofore, the embodiment of the present invention has been described, but the embodiment disclosed herein should be considered illustrative and non-restrictive in any respect. The scope of the present invention is defined by the terms of the claims, and is intended to include any modifications within the scope and meaning equivalent to the terms of the claims.

REFERENCE SIGNS LIST

100: setting screen; 102: button; 202: radio button; 204: deletion button; 1001: relay; 1002: broadband router; 1003: personal computer; 1004*a*, 1004*b*, 1004*c*: tap; 1005: air conditioner; 1006: refrigerator; 1007: television; 1008: tablet terminal; 1015, 1016, 1017: receptacle; 1051, 1061, 1071: power plug; 1101: control unit; 1103: light emitting unit; 1104: high-speed communication interface unit; 1105, 2104: power source unit; 1106: integrated communication controller unit; 1107, 2107: antenna; 1108: push button; 1109: slide switch; 1161, 2121: CPU; 1162, 2122: ROM; 1163, 2123: RAM; 1165, 2111, 2112, 2125: voltage input ADC unit; 2101: socket; 2102: plug; 2103: shunt resistor; 2106: setting button; 2110: power sensor unit; 2113: multiplier; 2114: frequency converting unit; 2120: low-speed wireless communication module; 2131, 2132, 2133: interconnection; 3110: associate device list; 3111, 3401: ZigBee application; 3112, 3402: ZigBee protocol stack; 3121: ZigBee manager; 3122: monitor library; 3124: switch control; 3801: setting information; 3802: setting CGI program; 3805: HTTP server.

The invention claimed is:

1. A control device that manages a network including a plurality of communication devices, comprising:
one or more processors and one or more memories storing instructions to:
make a transition to a leave mode for disconnecting at least one communication device of the plurality of communication devices from the network;
receive, from the at least one communication device a notification for disconnecting the at least one communication device from the network;
accept the notification from the at least one communication device;
transmit, when the notification is accepted from the at least one communication device during the leave mode, an instruction for setting a flag and a reset order to the at least one the communication device, the flag defining to bring the at least one communication device back to an initial state;
determine whether or not the instruction for setting the flag and the reset order are received by the at least one communication device; and
delete information about the at least one communication device connected to the network when it is determined that the instruction for setting the flag and the reset order are received.

2. The control device according to claim 1, wherein the one or more memories store instructions that further cause the one or more processors to:
   make the transition to the leave mode in accordance with a switch-operated instruction.

3. The control device according to claim 1, wherein the one or more memories store instructions that further causes the one or more processors to:
   make the transition to the leave mode in accordance with an execution instruction.

4. A control device that manages a network including a plurality of communication devices, comprising:
   one or more processors and one or more memories storing instructions to:
   accept an instruction for disconnecting at least one communication device of the plurality of communication devices from the network;
   transmit an instruction for setting a flag and a reset order to the at least one communication device, the flag defining to bring the communication device back to an initial state; and
   delete information about the at least one communication device connected to the network.

5. The control device according to claim 4, wherein the one or more memories stores instructions that further cause the one or more processors to:
   determine whether or not the instruction for setting the flag and the reset order are received and deletes information about the communication device connected to the network when it is determined that the instruction for setting the flag and the reset order are received.

6. A communication device comprising:
   one or more processors and one or more memories storing instructions to:
   transmit, in response to an instruction, a withdrawal declaration signal to a control device that manages a network including a plurality of communication devices, the withdrawal declaration signal declaring that the communication device has been withdrawn from the network;
   set a flag defining to bring the communication device back to an initial state, so as to disconnect the communication device from the network; and
   perform an initializing process in accordance with the flag.

7. The communication device according to claim 6, wherein the instruction is an instruction of an operation unit.

8. The communication device according to claim 6, wherein the instruction is an instruction from the control device.

* * * * *